US011861799B2

(12) United States Patent
Laaksonen et al.

(10) Patent No.: US 11,861,799 B2
(45) Date of Patent: Jan. 2, 2024

(54) MULTI-PARTICIPANT EXTENDED REALITY

(71) Applicant: Nokia Technologies Oy, Espoo (FI)

(72) Inventors: Lasse Juhani Laaksonen, Tampere (FI); Jussi Leppänen, Tampere (FI); Arto Lehtiniemi, Lempäälä (FI); Sujeet Shyamsundar Mate, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 76 days.

(21) Appl. No.: 17/546,521

(22) Filed: Dec. 9, 2021

(65) Prior Publication Data

US 2022/0198758 A1 Jun. 23, 2022

(30) Foreign Application Priority Data

Dec. 22, 2020 (EP) .................................... 20216666

(51) Int. Cl.

| | |
|---|---|
| ***G06T 19/00*** | (2011.01) |
| ***H04L 67/131*** | (2022.01) |
| ***H04L 12/18*** | (2006.01) |
| ***H04N 7/15*** | (2006.01) |

(52) U.S. Cl.

CPC ........ *G06T 19/006* (2013.01); *H04L 12/1818* (2013.01); *H04L 67/131* (2022.05); *H04N 7/157* (2013.01)

(58) Field of Classification Search

None

See application file for complete search history.

(56) References Cited

U.S. PATENT DOCUMENTS

| | | | | |
|---|---|---|---|---|
| 9,256,347 | B2 | 2/2016 | Finn et al. | |
| 10,496,156 | B2 | 12/2019 | Tilton et al. | |
| 2012/0304078 | A1 * | 11/2012 | Ramaswamy ........ | H04M 3/382 715/753 |

(Continued)

FOREIGN PATENT DOCUMENTS

| | | | |
|---|---|---|---|
| EP | 3699736 | A1 | 8/2020 |

OTHER PUBLICATIONS

Extended European Search Report received for corresponding European Patent Application No. 20216666.6, dated Jun. 16, 2021, 10 pages.

*Primary Examiner* — Yingchun He

(74) *Attorney, Agent, or Firm* — ALSTON & BIRD LLP

(57) ABSTRACT

An apparatus comprising means for:

means for joining to at least an existing participant in extended reality at a location in a virtual space, a joining participant in extended reality to enable a shared extended reality, wherein the joined participants in the shared extended reality are at least co-located in the virtual space and can share at least visually the virtual space;

wherein at least part of a content configuration is inherited from the existing participant by the joining participant, wherein the content configuration controls, for participants, what is heard, what is seen and interactivity with the virtual space;

wherein at least part of a join configuration is inherited between the existing participant and the joining participant, wherein the join configuration controls joining of other joining participants in the shared extended reality.

20 Claims, 9 Drawing Sheets

(56) References Cited

U.S. PATENT DOCUMENTS

| | | | |
|---|---|---|---|
| 2013/0268870 | A1 | 10/2013 | Dawson et al. |
| 2014/0085316 | A1 | 3/2014 | Narayanan |
| 2018/0005429 | A1* | 1/2018 | Osman .................... A63F 13/56 |
| 2018/0157333 | A1 | 6/2018 | Ross et al. |
| 2019/0313059 | A1 | 10/2019 | Agarawala et al. |

* cited by examiner

71_2
71_1
1
1
60_2
60_1
User A
Arto

60_1
71_2
71_1
2
60_2
60_1
User A
Arto

71_2
71_1
2
60_1
User A
Arto

71_2
71_1
60_2
User A
Arto

MULTI-PARTICIPANT EXTENDED REALITY

TECHNOLOGICAL FIELD

Embodiments of the present disclosure relate to multi-participant extended reality.

BACKGROUND

"Extended reality" or "mediated reality" allows a user to experience, for example visually, a fully or partially artificial environment (a virtual space) as a virtual scene at least partially rendered by an apparatus to the user. The virtual scene is determined by a virtual point of view within the virtual space.

Three degrees of freedom (3 DoF) describes extended reality where the virtual point of view is determined by orientation of the user only (e.g. the three degrees of three-dimensional orientation).

Six degrees of freedom (6 DoF) describes mediated reality where the virtual point of view is determined by both orientation (e.g. the three degrees of three-dimensional orientation) and location/movement (e.g. the three degrees of three-dimensional location).

A sub-genre of Six degrees of freedom (6 DoF) is 3 DoF+, where the virtual position is determined by both orientation (e.g. the three degrees of three-dimensional orientation) and restricted location/movement.

BRIEF SUMMARY

According to various, but not necessarily all, embodiments there is provided an apparatus comprising means for:

joining to at least an existing participant in extended reality at a location in a virtual space, a joining participant in extended reality to enable a shared extended reality, wherein the joined participants in the shared extended reality are at least co-located in the virtual space and can share at least visually the virtual space;

wherein at least part of a content configuration is inherited from the existing participant by the joining participant, wherein the content configuration controls, for participants, what is heard, what is seen and interactivity with the virtual space;

wherein at least part of a join configuration is inherited between the existing participant and the joining participant, wherein the join configuration controls joining of other joining participants in the shared extended reality.

In some but not all examples, the inheritance of the content configuration is hierarchical and has a direction from the existing participant to the joining participant who is joining the extended reality and wherein the inheritance of the joining configuration is hierarchical and is dependent upon one or more parameters of the joining configuration for the existing participant and one or more parameters of the joining configuration for the joining participant.

In some but not all examples, for the inheritance of the content configuration, the existing participant is dominant so that the joining participant has, at least initially, substantially the same content experience as the existing participant, wherein the joining participant inherits at least one or more parameters that control what is heard within the extended reality, what is seen within the extended reality, what interactivity is possible with objects within the virtual space.

In some but not all examples, for the inheritance of the joining configuration, the joining participant and/or the existing participant inherits at least one or more parameters that control one or more of:

whether and/or from whom to have explicit consent to join extended reality, whether and/or to whom to give notification of a request to join extended reality, and whether and/or to whom to give notification of a joining participant joining extended reality.

In some but not all examples, for the inheritance of the joining configuration, there is inherited equality so that, at least initially, the existing participant and the joining participant share the same control of joining, wherein at least one of the joining participant and/or the existing participant inherits at least one or more parameters that control joining that is more restrictive than its current parameter.

In some but not all examples, the join configuration for a participant adapts when the participant has an open voice communication channel to require explicit authorization for a join from the participant and the other user or users who are communicating in the voice communication channel.

In some but not all examples, the joining of the joining participant is dependent upon a content of the extended reality experienced by the existing participant.

In some but not all examples, the joining participant joins the existing participant in the extended reality in response to acceptance of a request to join made by the joining participant, wherein the join configuration of the existing participant determines whether the acceptance of a request to join made by the joining participant is automatic or is dependent upon an affirmation by the existing participant.

In some but not all examples, when a joining participant makes a request to join an existing participant in an extended reality at a location of the existing participant that is not accepted, then a contention resolution process determines a location in the virtual space at which the requesting user experiences extended reality and whether or not the requesting participant experiences a shared extended reality with another participant.

In some but not all examples, when a joining participant requests to join an existing participant in an extended reality at a location of the existing participant a response to the request can be:

join; rejection dependent upon existing user; rejection dependent upon content rendered for shared extended reality; request to join at different location;

timeout; or alternative join option.

In some but not all examples, after joining, the existing participant participates in extended reality and can control a point of view within virtual space;

a newly joined participant participates in extended reality and can control a point of view within virtual space, wherein the point of view associated with the existing participant and the point of view associated with the joining participant are independently controllable by the respective existing participant and the respective joining participant.

In some but not all examples, the apparatus comprises means for providing to the joining participant a preview of a shared extended reality before the joining participant requests to join the shared extended reality, wherein the preview comprises existing participants at the location.

In some but not all examples, the content configuration controls at least visual and/or audio interaction between participants of a shared extended reality.

According to various, but not necessarily all, embodiments there is provided a computer program that when run on one or more processors causes:

joining to at least an existing participant in extended reality at a location in a virtual space, a joining participant in extended reality to enable a shared extended reality, wherein the joined participants in the shared extended reality are at least co-located in the virtual space and can share at least visually the virtual space;

wherein at least part of a content configuration is inherited from the existing participant by the joining participant, wherein the content configuration controls, for participants, what is heard, what is seen and interactivity with the virtual space;

wherein at least part of a join configuration is inherited between the existing participant and the joining participant, wherein the join configuration controls joining of other joining participants in the shared extended reality.

According to various, but not necessarily all, embodiments there is provided a method comprising:

initiating joining to at least an existing participant in extended reality at a location in a virtual space, a joining participant in extended reality to enable a shared extended reality;

causing a content configuration to be inherited from the existing participant by the joining participant, wherein the content configuration controls, for participants, what is heard, what is seen and interactivity with the virtual space;

causing at least part of a join configuration to be inherited between the existing participant and the joining participant, wherein the join configuration controls joining of other joining participants in the shared extended reality;

completing joining to at least the existing participant in extended reality the joining participant in extended reality to enable a shared extended reality, wherein the existing participant and the joining participant, collectively the joined participants, are initially, at least co-located in the virtual space and can share at least visually the virtual space.

According to various, but not necessarily all, embodiments there is provided examples as claimed in the appended claims.

BRIEF DESCRIPTION

Some examples will now be described with reference to the accompanying drawings in which:

FIG. 1A, 1B; 2A, 2B; 3A, 3B show an example of the subject matter described herein;

Figure 1A:
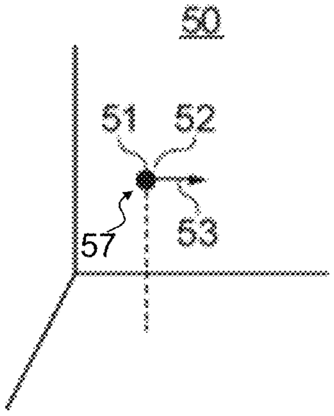

FIGS. 10, 11, 12, 13, 14, 15, 16A & 16B, 17A & 17B, 18A & 18B, 19A to 19D, and 20A to 20D show other examples of the subject matter described herein.

DEFINITIONS

"artificial environment" may be something that has been recorded or generated.

"virtual visual space" refers to a fully or partially artificial environment that may be viewed, which may be three dimensional.

"virtual visual scene" refers to a representation of the virtual visual space viewed from a particular point of view (position) within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view (position) within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view (position) within the real space.

"real visual scene" refers to a visual representation of the real space viewed from a particular real point of view (position) within the real space.

"extended reality" or "mediated reality" in this document refers to a user experiencing, for example visually, a fully or partially artificial environment (a virtual space) as a virtual scene at least partially rendered by an apparatus to a user. The virtual scene is determined by a point of view (virtual position) within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables extended (mediated) reality by, for example, providing one or more artificial virtual objects.

"extended reality content" or "mediated reality content" is virtual content which enables a user to experience, for example visually, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually, a partially artificial environment (a virtual space) as a virtual scene. Augmented reality content could include interactive content such as a video game or non-interactive content such as motion video.

"virtual reality content" is a form of mediated reality content which enables a user to experience, for example visually, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first person perspective-mediated" as applied to mediated reality, augmented reality or virtual reality means perspective mediated with the additional constraint that the user's real point of view (location and/or orientation) determines the point of view (virtual position) within the virtual space of a virtual user;

"third person perspective-mediated" as applied to mediated reality, augmented reality or virtual reality means perspective mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"virtual user" defines the point of view (virtual position-location and/or orientation) in virtual space used to generate a perspective-mediated sound scene and/or visual scene. A virtual user may be a notional listener and/or a notional viewer.

"notional listener" defines the point of view (virtual position-location and/or orientation) in virtual space used to generate a perspective-mediated sound scene, irrespective of whether or not a user is actually listening "notional viewer" defines the point of view (virtual position-location and/or orientation) in virtual space used to generate a perspective-mediated visual scene, irrespective of whether or not a user is actually viewing.

Three degrees of freedom (3 DoF) describes mediated reality where the virtual position is determined by orientation only (e.g. the three degrees of three-dimensional orientation). In relation to first person perspective-mediated reality, only the user's orientation determines the virtual position.

Six degrees of freedom (6 DoF) describes mediated reality where the virtual position is determined by both orientation (e.g. the three degrees of three-dimensional orientation) and location/movement (e.g. the three degrees of three-dimensional location/movement). In relation to first person perspective-mediated reality, both the user's orientation and the user's location/movement in the real space determine the virtual position.

Three degrees of freedom plus (3 DoF+) describes mediated reality where the virtual position is determined by both orientation (e.g. the three degrees of three-dimensional orientation) and restricted location/movement of the user (e.g. the three degrees of three-dimensional location/movement). In relation to first person perspective-mediated reality, both the user's orientation and the user's location/movement in the real space determine the virtual position.

DETAILED DESCRIPTION

The following Figures illustrate rendering of extended (mediated) reality using virtual content. In this context, extended (mediated) reality means the rendering of extended (mediated) reality for the purposes of achieving extended (mediated) reality for example augmented reality or virtual reality. In these examples, the extended (mediated) reality is first person perspective-mediated reality. It may or may not be user interactive. It may be 3 DoF, 3 DoF+ or 6 DoF, for example.

Figure 2A:
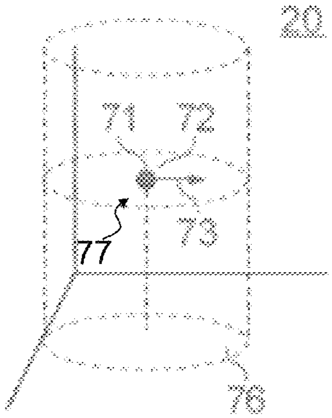
Figure 3A:
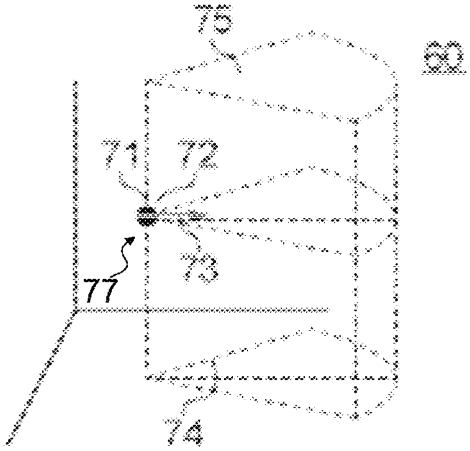

FIGS. 1A, 2A, 3A illustrate at a first time a real space 50, a virtual sound space 20 and a virtual visual space 60. There is correspondence between the virtual sound space 20 and the virtual visual space 60. A user 51 in the real space 50 has a position (point of view) 57 defined by a location 52 and an orientation 53. The location is a three-dimensional location and the orientation is a three-dimensional orientation.

In extended (mediated) reality there is a correspondence between a position (point of view) 57 of the user 51 and a virtual position (point of view) 77 of a virtual user 71. The position (point of view) 57 of the user 51 has an associated location 52 and orientation 53. The virtual position (point of view) 77 of the virtual user 71 has an associated virtual location 72 (corresponding to location 52) and an associated virtual orientation 73 (corresponding to orientation 53).

In 3 DoF extended (mediated) reality, an orientation 53 of the user 51 controls a virtual orientation 73 of a virtual user 71. There is a correspondence between the orientation 53 and the virtual orientation 73 such that a change in the orientation 53 produces the same change in the virtual orientation 73. The virtual orientation 73 of the virtual user 71 in combination with a virtual field of view 74 defines a virtual visual scene 75 within the virtual visual space 60. In some examples, it may also define a virtual sound scene 76. A virtual visual scene 75 is that part of the virtual visual space 60 that is displayed to a user. A virtual sound scene 76 is that part of the virtual sound space 20 that is rendered to a user. The virtual sound space 20 and the virtual visual space 60 correspond in that a position within the virtual sound space 20 has an equivalent position within the virtual visual space 60. In 3 D0F mediated reality, a change in the location 52 of the user 51 does not change the virtual location 72 or virtual orientation 73 of the virtual user 71.

In the example of 6 DoF mediated reality, the situation is as described for 3 DoF and in addition it is possible to change the rendered virtual sound scene 76 and the displayed virtual visual scene 75 by movement of a location 52 of the user 51. For example, there may be a mapping between the location 52 of the user 51 and the virtual location 72 of the virtual user 71. A change in the location 52 of the user 51 produces a corresponding change in the virtual location 72 of the virtual user 71. A change in the virtual location 72 of the virtual user 71 changes the rendered virtual sound scene 76 and also changes the rendered virtual visual scene 75.

Figure 1B:
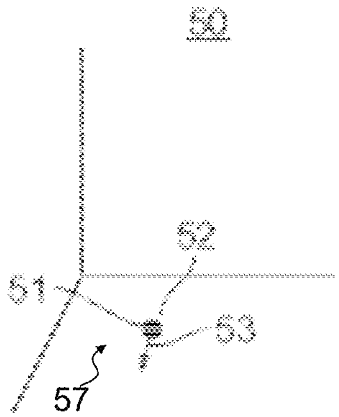
Figure 2B:
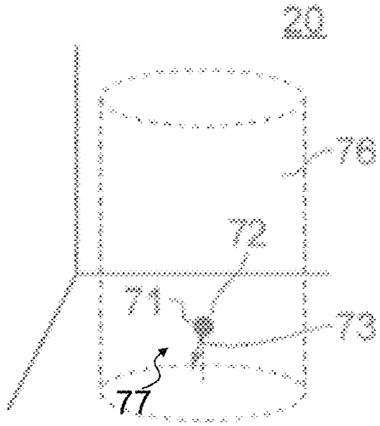
Figure 3B:
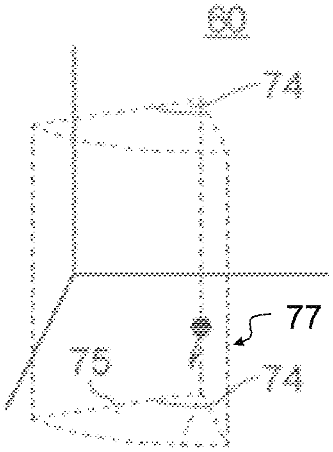

This may be appreciated from FIGS. 1B, 2B and 3B which illustrate the consequences of a change in location 52 and orientation 53 of the user 51 on respectively the rendered virtual sound scene 76 (FIG. 2B) and the rendered virtual visual scene 75 (FIG. 3B).

In the following examples reference will be made to the virtual space 60 this comprises the virtual visual space. It additionally comprises a corresponding virtual sound space 20 if one exists.

In the following examples reference will be made to a participant or participants. A participant is a (virtual) user who is participating in extended reality. In the context of the real space 50, the participant is the user 51. In the context of the virtual space 60, the participant is the virtual user 71. The term ‘participant’ therefore refers, depending on context, to the user 51 and/or the virtual user 71.

Figure 4A:
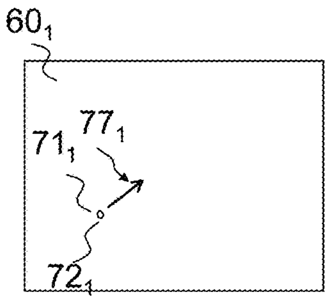
FIG. 4A, 4B, 4C show another example of the subject matter described herein.
Figure 4B:
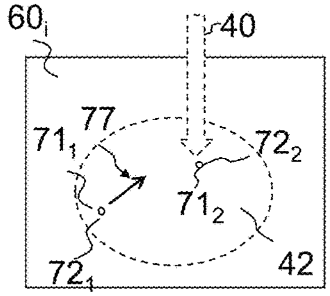
Figure 4C:
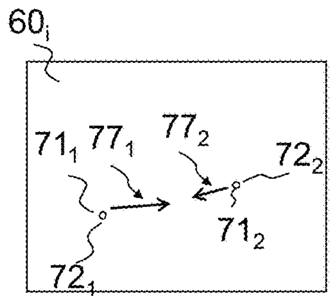

The examples of FIGS. 4A, 4B, 4C illustrate, respectively, before, during and after joining 40 a joining participant $\mathbf{71}_2$ to at least an existing participant $\mathbf{71}_1$ to enable a shared extended reality.

Joining a joining participant $\mathbf{71}_2$ to an existing participant $\mathbf{71}_1$ to enable shared extended reality means that the existing participant $\mathbf{71}_1$ and the joining participant $\mathbf{71}_2$ are co-located 42 in a virtual space 60 and share, at least visually, the virtual space 60.

FIG. 4A illustrates an existing participant $\mathbf{71}_1$ in extended reality in a virtual space $\mathbf{60}_1$. The existing participant $\mathbf{71}_1$ is at a location $\mathbf{72}_1$ and has a point of view $\mathbf{77}_1$.

FIG. 4B illustrates joining 40, to at least the existing participant $\mathbf{71}_1$ in extended reality, who is at the location $\mathbf{72}_1$ in the virtual space $\mathbf{60}_1$, a joining participant $\mathbf{71}_2$ in extended reality to enable a shared extended reality. The joined participants $\mathbf{71}_1$, $\mathbf{71}_2$ in the shared extended reality are at least co-located 42 in the virtual space 60 and can share at least visually the virtual space $\mathbf{60}_i$. The shared virtual space $\mathbf{60}_i$ can be the original virtual space $\mathbf{60}_1$ or some other portion of the virtual space 60.

The participants $\mathbf{71}_1$, $\mathbf{71}_2$ are co-located, in the shared virtual space $\mathbf{60}_i$, in that they can share, at least visually, the virtual space 60 in a shared extended reality.

The existing participant $\mathbf{71}_1$ has a location $\mathbf{72}_1$ in the shared virtual space $\mathbf{60}_i$ and the joining participant $\mathbf{71}_2$ has a location $\mathbf{72}_2$ in the same shared virtual space $\mathbf{60}_i$. The location $\mathbf{72}_1$ and the location $\mathbf{72}_2$ are within a threshold distance of each other. Thus in at least some examples, the joining participant $\mathbf{71}_2$ is located, in the shared virtual space $\mathbf{60}_i$, within a threshold distance of a location $\mathbf{72}_1$ of the existing participant $\mathbf{71}_1$ in the shared virtual space $\mathbf{60}_i$.

If we have a 3 DoF experience (such as multi-viewpoint 3 DoF experience) then the two or more participants do not necessarily see each other since they would occupy the same position in space (with freedom of having different view direction). But they can have a visual indication of each other's presence, and they would typically hear each other. If we have a 6 DoF experience, then the users can generally see each other and hear each other.

The participants 51 (71) can have the same or different points of view 57(77). In this example, the existing participant $\mathbf{71}_1$ has a point of view $\mathbf{77}_1$ and the joining participant $\mathbf{71}_2$ has a point of view $\mathbf{77}_2$. The point of view $\mathbf{77}_1$ and the point of view $\mathbf{77}_2$ can be co-dependent. For example, in this example the point of view $\mathbf{77}_1$ is towards the joining participant $\mathbf{77}_2$ and the point of view $\mathbf{72}_2$ is towards the existing participant $\mathbf{77}_1$. In other examples, the point of view $\mathbf{77}_1$ and the point of view $\mathbf{77}_2$ are towards a particular portion of the virtual space $\mathbf{60}_i$ such as a virtual object.

In at least some examples, when the joining participant $\mathbf{71}_2$ and the existing participant $\mathbf{71}_1$ are joined to share the virtual space 60 (FIG. 4C), the orientation of the point of view $\mathbf{77}_2$ of the joining participant $\mathbf{71}_2$ in the virtual space 60 is selected so that the existing participant $\mathbf{71}_1$ is immediately visible to the joining participant $\mathbf{71}_2$. This can be achieved by selecting the orientation of the point of view $\mathbf{77}_2$ of the joining participant $\mathbf{71}_2$ to be substantially aligned (with the margin of the field of view) with the location 721 of the existing participant 711 in the virtual space 60.

In at least some examples, when the joining participant $\mathbf{71}_2$ and the existing participant $\mathbf{71}_1$ are joined to share the virtual space 60 (FIG. 4C), the location $\mathbf{72}_2$ of the joining participant $\mathbf{71}_2$ in the virtual space 60 is selected so that the joining participant $\mathbf{71}_2$ is immediately visible to the existing participant $\mathbf{71}_1$ within the virtual visual scene 75. This can be achieved by selecting the location $\mathbf{72}_2$ of the joining participant $\mathbf{71}_2$ in the virtual space 60 to be substantially aligned (with the margin of the field of view) with the orientation of the point of view $\mathbf{77}_1$ of the existing participant $\mathbf{71}_1$.

FIG. 4C illustrates participants $\mathbf{71}_1$, $\mathbf{71}_2$ sharing extended reality within the shared virtual space $\mathbf{60}_i$. In this example, but not necessarily all examples, the participants $\mathbf{71}_1$, $\mathbf{71}_2$ can independently experience the extended reality within the shared virtual space $\mathbf{60}_i$ by changing their respective points of view $\mathbf{77}_1$, $\mathbf{77}_2$.

In at least some examples, the participants 51 (71) have different points of view 57(77). For example, the first virtual user $\mathbf{71}_1$ has a first point of view $\mathbf{77}_1$ that corresponds to a first point of view $\mathbf{57}_1$ of the first real user $\mathbf{51}_1$ and the second virtual user $\mathbf{71}_2$ has a second point of view $\mathbf{77}_2$ that corresponds to a second point of view $\mathbf{57}_2$ of the second real user $\mathbf{51}_2$. The first point of view $\mathbf{77}_1$ is controlled independently of the second point of view $\mathbf{77}_2$ In the example illustrated, the first point of view $\mathbf{57}_1$ of the first real user $\mathbf{51}_1$ is tracked using a head mounted apparatus $10_1$ worn by the first real user $51_1$ and the second point of view $57_2$ of the second real user $51_2$ is tracked using a head mounted apparatus $10_2$ worn by the second real user $51_2$.

After joining, the existing participant $71_1$ participates in extended reality and can control the point of view $77_1$ within virtual space $60_1$ and the new participant $71_2$ participates in extended reality and can control the point of view $77_2$ within virtual space $60_1$. The point of view $77_1$ associated with the existing participant $71_1$ and the point of view $77_2$ associated with the joining participant $71_2$ are independently controllable by the respective existing participant $71_1$ and the respective joining participant $71_2$.

Although the example illustrated in FIGS. 4B and 4C, illustrates 6 DoF, with different locations for the points of view $77_1$, $77_2$, it is also relevant to 3 DoF where the locations for the points of view $77_1$, $77_2$ can be the same and fixed.

The extended reality rendered to a participant 71 is determined, at least in part, by extended reality content. The extended reality content has a visual element, and can also have an audio element. It can also have an interactive element. The audio element can be an input channel (if and how a participant is heard) and/or an output channel (if and how a participant hears). The visual element can be an input channel (if and how a participant is seen) and/or an output channel (how a participant sees).

The interactive element can control if the participant is an observer (passive) or an interactor (active). When the participant 71 is an interactor, the participant can interact with objects within the virtual space 60.

The extended reality content rendered to a participant 51, 71 is dependent upon the point of view 57, 77 of the participant 51, 71. At least the visual element of the extended reality content rendered to a participant 51, 71 (the virtual visual scene) is dependent upon the point of view 57, 77 of the participant 51, 71. Changing the point of view 57, 77 changes the virtual visual scene. The audio element of the extended reality content rendered to a participant 51, 71 (the virtual sound scene) can, in some examples, be dependent upon the point of view 57, 77 of the participant 51, 71. Changing the point of view 57, 77 changes the virtual sound scene. The interactive element of the extended reality content rendered to a participant 51, 71 (the virtual interactive scene) can, in some examples, be dependent upon the point of view 57, 77 of the participant 51, 71. Changing the point of view 57, 77 changes the availability of virtual objects, in the virtual visual scene, for interaction.

A content configuration is used to control at least visual and/or audio interaction between participants of a shared extended reality. A content configuration controls, for participants $51_1$, $51_2$ ($71_1$, $71_2$) in extended reality, what is heard, what is seen and interactivity with the virtual space 60.

The content configuration $30_i$ can control, for participant $71_i$ in extended reality, what is heard, what is seen and interactivity with the virtual space 60 (as appropriate) including whether the participant $71_i$ is seen by another participant $71_j$ or other participants $71_j$, whether the participant $71_i$ is heard by another participant $71_j$ or other participants $71_j$, whether the participant $71_i$ sees another participant $71_j$ or other participants $71_j$, whether the participant $71_i$ hears another participant $71_j$ or other participants $71_j$. The content configuration 30 controls visual and/or audio communication between participants 71.

Figure 5:
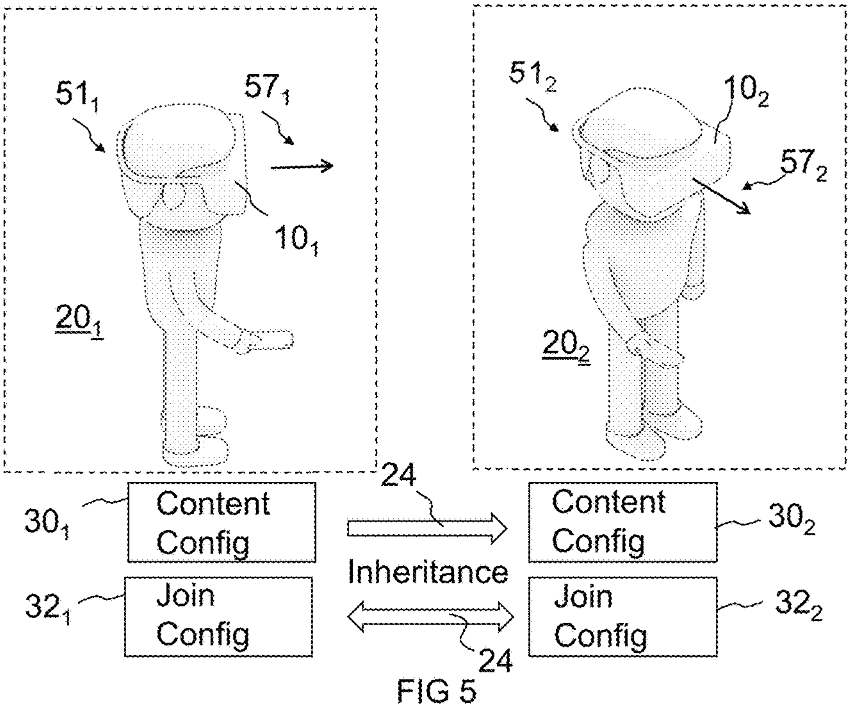
FIG. 5 shows another example of the subject matter described herein.

The example of FIG. 5 illustrates that at least part of a content configuration $30_1$ is inherited 24 from the existing participant $51_1$ ($71_1$) by the joining participant $51_2$ ($71_2$).

Thus, the content configuration $30_1$ controls, what the existing participant $71_1$ sees and/or hears. It can also control how the existing participant $71_1$ sees and/or hears the joining participant $71_2$.

The content configuration $30_1$ is inherited by the joining participant $71_2$. It controls what the joining participant $71_2$ sees and/or hears. It can control how the joining participant $71_2$ sees and/or hears the existing participant $71_1$.

The content configuration $30_1$ of the existing participant $71_1$ that is inherited by the joining participant $71_2$ can in some examples be dependent upon the content rendered in the virtual visual scene and/or setting for the existing participant $71_1$ or the apparatus $10_1$ associated with the existing participant $71_1$ and/or the capability of the apparatus $10_1$ associated with the existing participant $71_1$.

FIG. 5 also illustrates that at least part of a join configuration 32 is inherited 24 between the existing participant $51_1$ ($71_1$) and the joining participant $51_2$ ($71_2$), The join configuration 32 controls joining of participants in the shared extended reality to the participant 51(71) associated with that join configuration.

The join configuration 32 controls when one participant 71 is joined to another participant 71 in a shared extended reality experience. The join configuration 32 can for example define a set of conditions for joining. The join configuration 32 can, for example, define when to refuse a join, when to allow a join unconditionally and when to allow a join with conditions.

The joining participant $71_2$ can join the existing participant $71_1$ in the extended reality in response to acceptance of a request to join made by the joining participant $71_2$. The join configuration of the existing participant $71_1$ determines whether the acceptance of the request to join made by the joining participant $71_2$ is automatic or is dependent upon an affirmation by the existing participant $71_1$.

The join configuration applied to a join to a particular existing participant $71_1$ can, for example, depend upon whether the particular existing participant $71_1$ is alone or in a group of existing participants $71_1$. The join configuration can, for example, be modified by inheritance from other participants. The join configuration can for example be dependent upon a privacy setting of the existing participant (s) $71_1$.

The join configuration can for example be dependent upon whether or not a communication channel exists between the existing participants $71_1$.

Inheritance means that parameters of a content configuration 30 and join configuration 32 are transferred from a (source) configuration to another (target) configuration where they are used. A new parameter may be added to the configuration or an existing parameter may be replaced or removed. The group of configurations including the source and target configurations will, after inheritance, have at least some common parameters.

Hierarchy of inheritance determines a direction of inheritance. Hierarchy can be defined for all inherited parameters or separately for parameters or groups of parameters.

The direction of inheritance can, in some examples, be unidirectional between the joining participant $71_2$ and the existing participant(s) $71_1$. The direction of inheritance can, in some examples, be bi-directional between the joining participant $71_2$ and the existing participant(s) $71_1$.

The inheritance 24 of the content configuration 30 is different to the inheritance 24 of the join configuration 32.

The inheritance 24 of the content configuration 30 is hierarchical with a direction of inheritance 24 from the existing participant $71_1$ to the joining participant $71_2$.

The inheritance 24 of the join configuration 32 is hierarchical with a direction of inheritance 24 between the existing participant $71_1$ to the joining participant $71_2$ based on the respective content configurations 20 of the existing participant $71_1$ and the joining participant $71_2$. What is inherited, by whom and from whom is based on the respective content configurations 20 of the existing participant(s) $71_1$ and the joining participant $71_2$. The inheritance 24 of the join configuration 32 is dependent upon one or more parameters of the join configuration $32_1$ for the existing participant $71_1$ and one or more parameters of the join configuration $32_2$ for the joining participant $71_2$.

In at least some examples, audio and/or visual feedback is provided to the participant 71 who is a destination of the inheritance of the content configuration 30 and/or feedback is provided to the participant 71 who is the source of the inheritance of the content configuration 30.

In at least some examples, audio and/or visual feedback is provided to the participant who is a destination of the inheritance of a join configuration 32 and/or feedback is provided to the participant who is the source of the inheritance of a joining configuration.

For the inheritance of the content configuration 30, the existing participant $71_1$ is dominant and the inheritance is unidirectional.

Some or all of the parameters of the source content configuration $30_1$ (the content configuration of the existing participant $71_1$) are transferred to the target configuration (the content configuration of the joining participant $71_2$).

For the inheritance of the content configuration, the existing participant $71_1$ is dominant so that the joining participant $71_2$ has, at least initially, substantially the same content experience as the existing participant $71_1$. The joining participant $71_2$ inherits at least one or more audio parameters that control what is heard within the extended reality. The audio parameters of the content configuration can for example define a hearing focus, volume levels, etc. The joining participant $71_2$ inherits at least one or more visual parameters that control what is seen within the extended reality. The visual parameters can, for example, define a visual focus. Optionally the joining participant $71_2$ inherits at least one or more interaction parameters that control what interactivity is possible with objects within the virtual space 60.

After inheritance of the content configuration 30, there is equality of content configuration—each participant 71 has the same common content configuration 30, at least initially. Each participant 71 therefore has the same shared experience of the extended reality content in the shared extended reality.

In at least some examples, commonality between the content configuration 30 of participants 71 in a shared extended reality can be enforced. For example, participant modification of the content configuration 30 may not be allowed or only allowed within defined limits to enforce commonality of experience and prevent significant differences in content experience. In at least some examples, if a participant attempts to modify or to significantly modify their content configuration 30 they are instead offered an option to un-join from the shared extended reality.

For the inheritance of the join configuration, the existing participant $71_1$ is not necessarily dominant and the inheritance is not necessarily unidirectional.

Some or all of the parameters of a source join configuration 32 are transferred to a target join configuration 32. The source join configuration 32 can be the join configuration $32_1$ of the existing participant $71_1$ and the target join configuration 32 can be the join configuration $32_2$ of the joining participant $71_2$ and/or the source join configuration 32 can be the join configuration $32_2$ of the joining participant $71_2$ and the target join configuration 32 can be the join configuration $32_1$ of the existing participant $71_1$.

The inheritance of the join configuration 32 is dependent upon one or more parameters of the join configuration $32_1$ for the existing participant $71_1$ and one or more parameters of the join configuration $32_2$ for the joining participant $71_2$. The most restrictive parameters are dominant.

In some examples, the existing participant $71_1$ is dominant acting as a host and the joining participant $71_2$ is a guest.

In some examples, the existing participant $71_1$ is not dominant acting as a member and the joining participant $71_2$ is an equal member.

For the inheritance of the join configuration 32, the existing participant $71_1$ and the joining participant $71_2$ provide substantially the same joining experience to another joining participant. The joining participant $71_2$ and/or the existing participant $71_1$ inherits at least one or more parameters that control whether and/or from whom to have explicit consent to join extended reality whether and/or to whom to give notification of a request to join extended reality whether and/or to whom to give notification of a joining participant joining extended reality.

For the inheritance of the join configuration 32, there can be inherited equality so that, at least initially, the existing participant $71_1$ and the joining participant $71_2$ share the same control of joining. At least one of the joining participant $71_2$ and/or the existing participant $71_1$ inherits at least one or more parameters that control joining that is more restrictive than its current parameter. The more restrictive parameters are dominant and are inherited.

In at least some examples, the join configuration for an existing participant $71_1$ adapts when the existing participant $71_1$ has an open audio communication channel, to require explicit authorization for a join from the existing participant $71_1$ and the other user or users who are communicating in the communication channel.

In at least some examples, the joining participant $71_2$ is provided with a preview of a shared extended reality before the joining participant $71_2$ requests to join the shared extended reality, wherein the preview comprises existing participants $71_1$ at the location of the join. The preview can give a visual indication of join configurations $32_1$ of the existing participant(s) $71_1$.

In at least some examples, the joining of the join configuration 32 is dependent upon a content of the extended reality experienced by the existing participant $71_1$. For example, a join can be auto rejected based on extended reality content.

The extended reality content can for example have associated metadata that defines allowed/disallowed join points.

The narrative of the extended reality content can, for example, be protected for the existing participant $71_1$ and/or the joining participant $71_2$. Access to content is, for example, allowed/disallowed based on a content history of the joining participant $71_2$. Access to content is, for example, allowed/disallowed based on importance of current content to a narrative for the existing participant $71_1$. Access to content is, for example, allowed/disallowed based on an importance of content to a narrative for the joining participant $71_2$.

Figure 6:
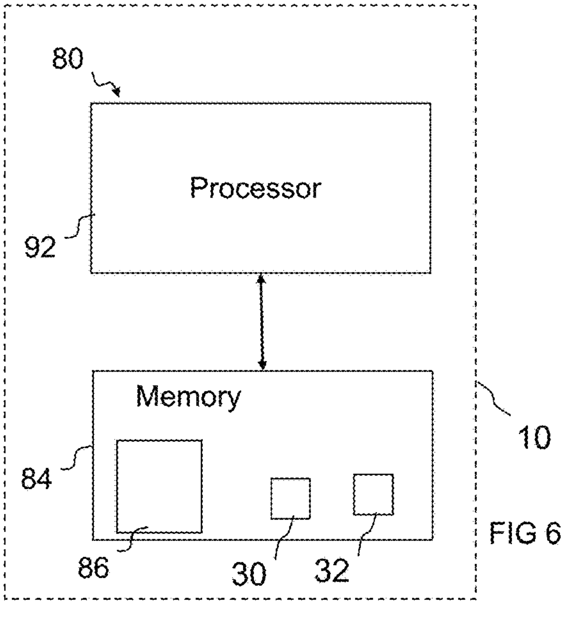
FIG. 6 shows another example of the subject matter described herein.

FIG. 6 illustrates an example of a controller 80 suitable for use in an apparatus 10. Implementation of a controller 80 may be as controller circuitry. The controller 80 may be implemented in hardware alone, have certain aspects in software including firmware alone or can be a combination of hardware and software (including firmware).

As illustrated in FIG. 6 the controller 80 may be implemented using instructions that enable hardware functionality, for example, by using executable instructions of a computer program 86 in a general-purpose or special-purpose processor 92.

The processor 92 is configured to read from and write to the memory 84. The processor 92 may also comprise an output interface via which data and/or commands are output by the processor 92 and an input interface via which data and/or commands are input to the processor 92.

The memory 84 stores a computer program 86 comprising computer program instructions (computer program code) that controls the operation of the apparatus 10 when loaded into the processor 92. The computer program instructions, of the computer program 86, provide the logic and routines that enables the apparatus to perform the methods illustrated in the various FIGs. The processor 92 by reading the memory 84 is able to load and execute the computer program 86.

The apparatus 10 therefore comprises:

at least one processor 92; and at least one memory 84 including computer program code the at least one memory 84 and the computer program code configured to, with the at least one processor 92, cause the apparatus 10 at least to perform:

initiating joining to at least an existing participant in extended reality at a location in a virtual space, a joining participant in extended reality to enable a shared extended reality;

causing a content configuration to be inherited from the existing participant by the joining participant, wherein the content configuration controls, for participants, what is heard, what is seen and interactivity with the virtual space;

causing at least part of a join configuration to be inherited between the existing participant and the joining participant, wherein the join configuration controls joining of other joining participants in the shared extended reality.

completing joining to at least the existing participant in extended reality the joining participant in extended reality to enable a shared extended reality, wherein the existing participant and the joining participant, collectively the joined participants, are initially, at least co-located in the virtual space and can share at least visually the virtual space.

Figure 7:
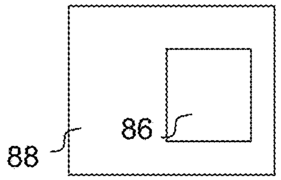
FIG. 7 shows another example of the subject matter described herein.

As illustrated in the example of FIG. 7, the computer program 86 may arrive at the apparatus 10 via any suitable delivery mechanism 88. The delivery mechanism 88 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 86. The delivery mechanism may be a signal configured to reliably transfer the computer program 86. The apparatus 10 may propagate or transmit the computer program 86 as a computer data signal.

Computer program instructions for causing an apparatus to perform at least the following or for performing at least the following:

joining to at least an existing participant in extended reality at a location in a virtual space, a joining participant in extended reality to enable a shared extended reality, wherein the joined participants in the shared extended reality are at least co-located in the virtual space and can share at least visually the virtual space;

wherein at least part of a content configuration is inherited from the existing participant by the joining participant, wherein the content configuration controls, for participants, what is heard, what is seen and interactivity with the virtual space;

wherein at least part of a join configuration is inherited between the existing participant and the joining participant, wherein the join configuration controls joining of other joining participants in the shared extended reality.

The computer program instructions may be comprised in a computer program, a non-transitory computer readable medium, a computer program product, a machine readable medium. In some but not necessarily all examples, the computer program instructions may be distributed over more than one computer program.

Although the memory 84 is illustrated as a single component/circuitry it may be implemented as one or more separate components/circuitry some or all of which may be integrated/removable and/or may provide permanent/semi-permanent/dynamic/cached storage.

Although the processor 92 is illustrated as a single component/circuitry it may be implemented as one or more separate components/circuitry some or all of which may be integrated/removable. The processor 92 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGs may represent steps in a method and/or sections of code in the computer program 86. The illustration of a particular order to the blocks does not necessarily imply that there is a required or preferred order for the blocks and the order and arrangement of the block may be varied. Furthermore, it may be possible for some blocks to be omitted.

The apparatus 10 can, for example, be a head-mounted apparatus of a participant.

The apparatus 10 can, for example, be a head-mounted apparatus of a joining participant. The apparatus 10 can, for example, be a head-mounted apparatus of an existing participant. A head mounted apparatus can, for example, comprise a head-up display and headphones.

The apparatus 10 can, for example, be a control device or system for communicating with head-mounted apparatus of participants.

The apparatus 10 comprises means 80 for:

joining 40 to at least an existing participant $\mathbf{71}_1$ in extended reality at a location in a virtual space 60, a joining participant $\mathbf{71}_2$ in extended reality to enable a shared extended reality, wherein the joined participants $\mathbf{71}_1$, $\mathbf{71}_2$ in the shared extended reality are at least co-located 42 in the virtual space 60 and can share at least visually the virtual space 60;

wherein at least part of a content configuration 30 is inherited 24 from the existing participant $\mathbf{71}_1$ by the joining participant $\mathbf{71}_2$, wherein the content configuration 30 controls, for participants 71, what is heard, what is seen and interactivity with the virtual space 60;

wherein at least part of a join configuration 32 is inherited 24 between the existing participant $\mathbf{71}_1$ and the joining participant $\mathbf{71}_2$, wherein the join configuration 32 controls joining of other joining participants in the shared extended reality.

Figure 8:
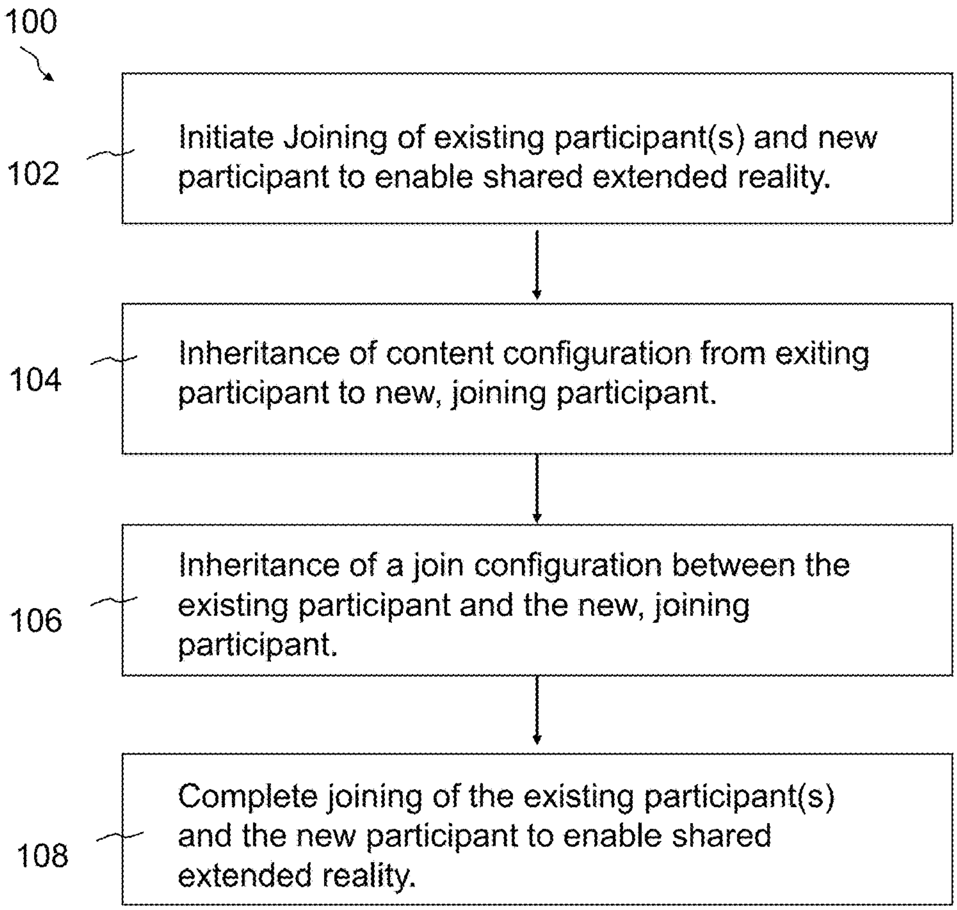
FIG. 8 shows another example of the subject matter described herein.

FIG. 8 illustrates an example of a method 100.

The method comprises, at block 102, initiating joining to at least an existing participant in extended reality at a location in a virtual space, a joining participant in extended reality to enable a shared extended reality.

The method comprises, at block 104, causing a content configuration to be inherited from the existing participant by the joining participant, wherein the content configuration controls, for participants, what is heard, what is seen and interactivity with the virtual space;

The method comprises, at block 106, causing at least part of a join configuration to be inherited between the existing participant and the joining participant, wherein the join configuration controls joining of other joining participants in the shared extended reality.

The method comprises, at block 108, completing joining to at least the existing participant in extended reality the joining participant in extended reality to enable a shared extended reality, wherein the existing participant and the joining participant, collectively the joined participants, are initially, at least co-located in the virtual space and can share at least visually the virtual space.

Use Cases

The extended reality content can in some examples be 3 DoF (three degrees of freedom) content. A participant 51, 71 in the extended reality enabled by the extended reality content can rotate their head to change their point of view 57, 77 (change of orientation only) and experience different virtual visual scenes (and in some examples different sound scenes). The 3 DoF extended reality content can define different and distinct virtual visual scenes (and optionally associated sound scenes), that are not adjacent in the virtual space 60, but which can be accessed by changing the point of view 57, 77 by changing orientation. For example, this can be called multi-viewpoint 3 DoF content. While the transition from a first point of view to an adjacent second point of view is continuous, the transition in virtual space 60 is a discontinuous jump in space or in space and time, a teleport.

The extended reality content can in some example be 6 DoF (six degrees of freedom) or 3 DoF+ content (e.g., multi-viewpoint 3 DoF+ content). A participant 51, 71 in the extended reality enabled by the extended reality content can rotate to change their point of view 57, 77 and change their position to change their point of view 57, 77 (change in orientation and/or position). Changing the point of view 57, 77 changes the virtual visual scenes (and in some examples the sound scene). The 6 DoF extended reality content can define different and distinct virtual visual scenes (and optionally associated sound scenes), that are not adjacent in the virtual space 60, but which can be accessed at changing the point of view 57, 77 by changing location and/or orientation. While a transition from a first point of view to an adjacent second point of view is continuous, the transition in virtual space 60 can be a discontinuous jump in space or in space and time, a teleport.

The extended reality content can also be consumed by more than one participant 71 at the same time such that the users can share a common extended reality. Such participants 71 can, in at least some examples, observe each other in the virtual space 60 and communicate with each other. This type of use case may be called "social" extended reality. The participants 71 can be in physical proximity in the real space 50 or remote from each other.

A participant 71 in extended reality is generally provided with means to enter and leave the extended reality at their own time, join one or more other participants 71 that are already in extended reality, and invite participants 71 to extended reality.

A participant 71 can also, in at least some examples, control privacy. For example, an 'open-door' mode can allow the existing participant $\mathbf{71}_1$ to be joined in the extended reality without a need for affirmation from the existing participant $\mathbf{71}_1$. For example, a 'closed-door' mode can allow the existing participant $\mathbf{71}_1$ to be joined in the extended reality but only after their affirmation by the existing participant $\mathbf{71}_1$. For example, a 'private' mode can prevent the existing participant $\mathbf{71}_1$ being joined in the extended reality. Privacy can be a parameter in a join configuration 32.

In the following examples, joining a participant (or user) refers to a user moving/being moved to close proximity to another user in the virtual space 60 via a teleport and the two users becoming mutually audible and visible. The examples are relevant for any type of extended reality including 3 DoF, 3 DoF+, 6 DoF or some other variant.

In the following examples, a User A is in extended reality and wants to change to a different part of the virtual space 60. This can be done by teleporting. The user A is the joining participant $\mathbf{71}_2$.

A participant $\mathbf{71}_2$ in extended reality (user A) is a in a virtual space $\mathbf{60}_2$ that is distinct from another virtual space $\mathbf{60}_1$ such that a teleport is required for the participant $\mathbf{71}_2$ in extended reality (user A) to transfer from the virtual space $\mathbf{60}_2$ to participate in extended reality at the virtual space $\mathbf{60}_1$.

Teleporting may, for example, be implemented such that user A moves a teleportation target to a place where they wish to move to, and upon confirmation they are immediately transferred there. Typically, this is done using a controller, and possible and unallowed targets are shown in different colors.

Figure 9:
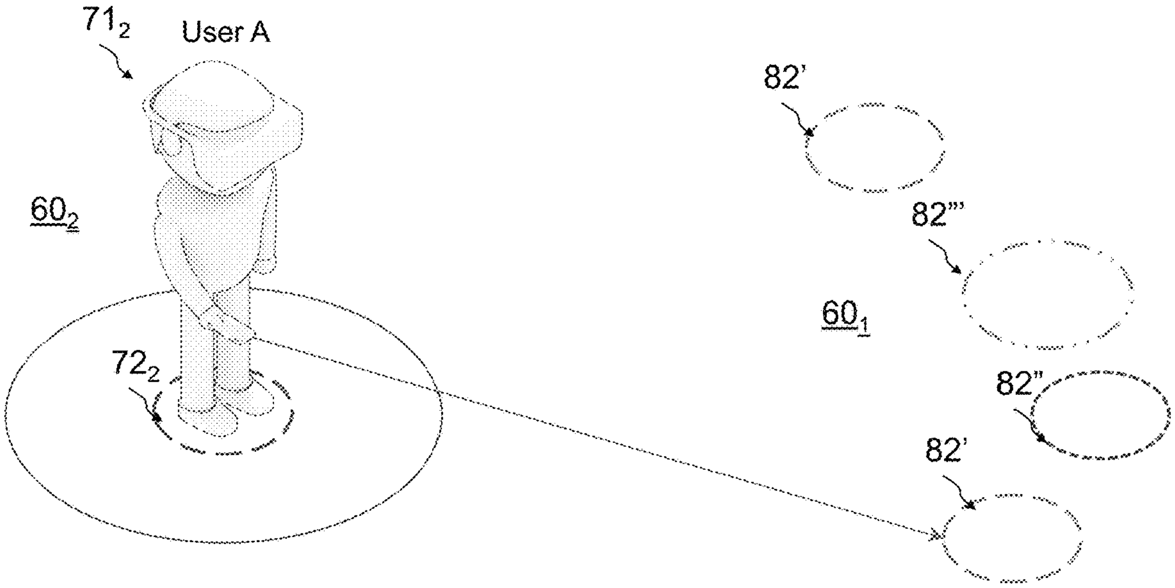
FIG. 9 shows another example of the subject matter described herein.

In the example illustrated in FIG. 9, the joining participant $\mathbf{71}_2$ (User A) points to different teleport regions 82 that may indicate, e.g., by color whether it is possible to transfer there or not. The teleport regions include, in this example, available teleport regions 82', conditionally available teleport regions 82''' and unavailable teleport regions 82''.

Figure 10:
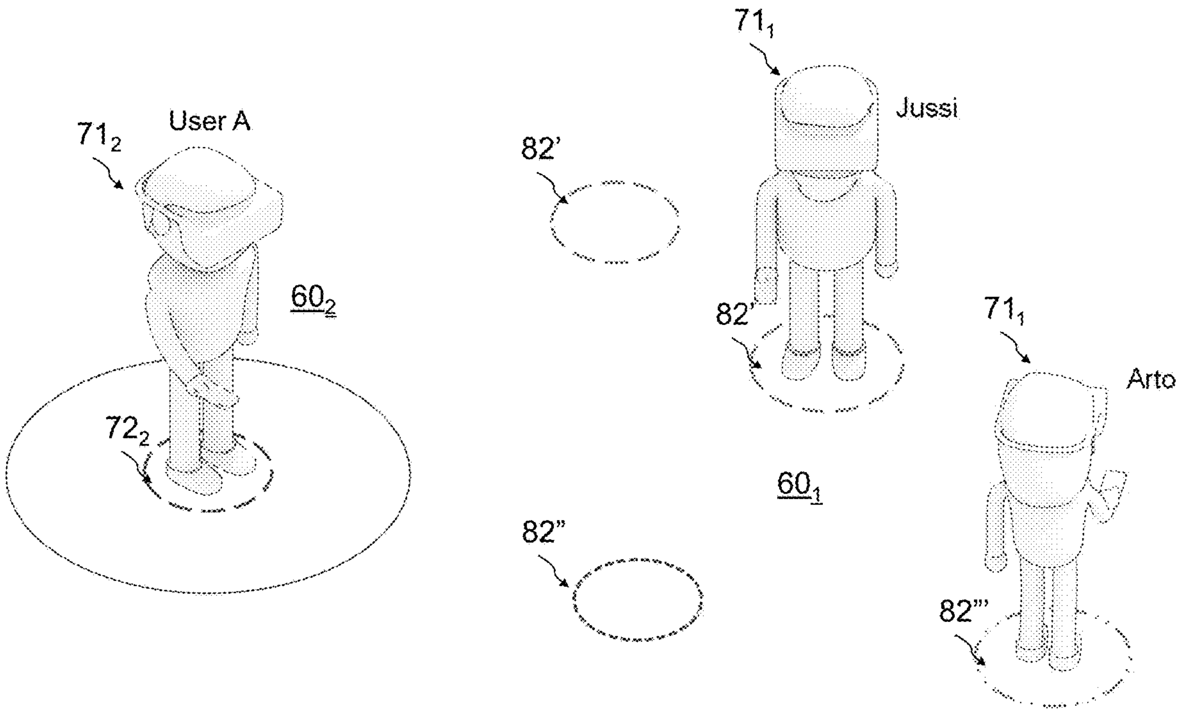

Referring to the example of FIG. 10, the participant $\mathbf{71}_2$ in extended reality (User A) wishes to teleport from virtual space $\mathbf{60}_2$ to virtual space $\mathbf{60}_1$ to experience multi-user extended reality. His friends Jussi and Arto are existing participants $\mathbf{71}_1$ in extended reality in the same virtual space $\mathbf{60}_1$ and are experiencing the same content at different nearby positions. Jussi $\mathbf{71}_1$ and Arto $\mathbf{71}_1$ have join configurations 22 [not illustrated] that allow other users to join them. For example, Jussi $\mathbf{71}_1$ has an associated join configuration 32 that allows directly joining without confirmation. Arto $\mathbf{71}_1$ has an associated join configuration 32 that conditionally allows joining. In this example, it requires that the joining participant $\mathbf{71}_2$ (User A) sends a request to join to Arto $\mathbf{71}_1$ and also requires that Arto $\mathbf{71}_1$ replies to the request confirming the join before the join occurs.

The fact that Arto $\mathbf{71}_1$ and Jussi $\mathbf{71}_1$ have different join configurations 22 is indicated in this example via the teleport regions 82. Jussi $\mathbf{71}_1$ is presented as located within an available teleport region 82' and Arto $\mathbf{71}_1$ is presented as located within a conditionally available teleport region 82'''.

Figure 11:
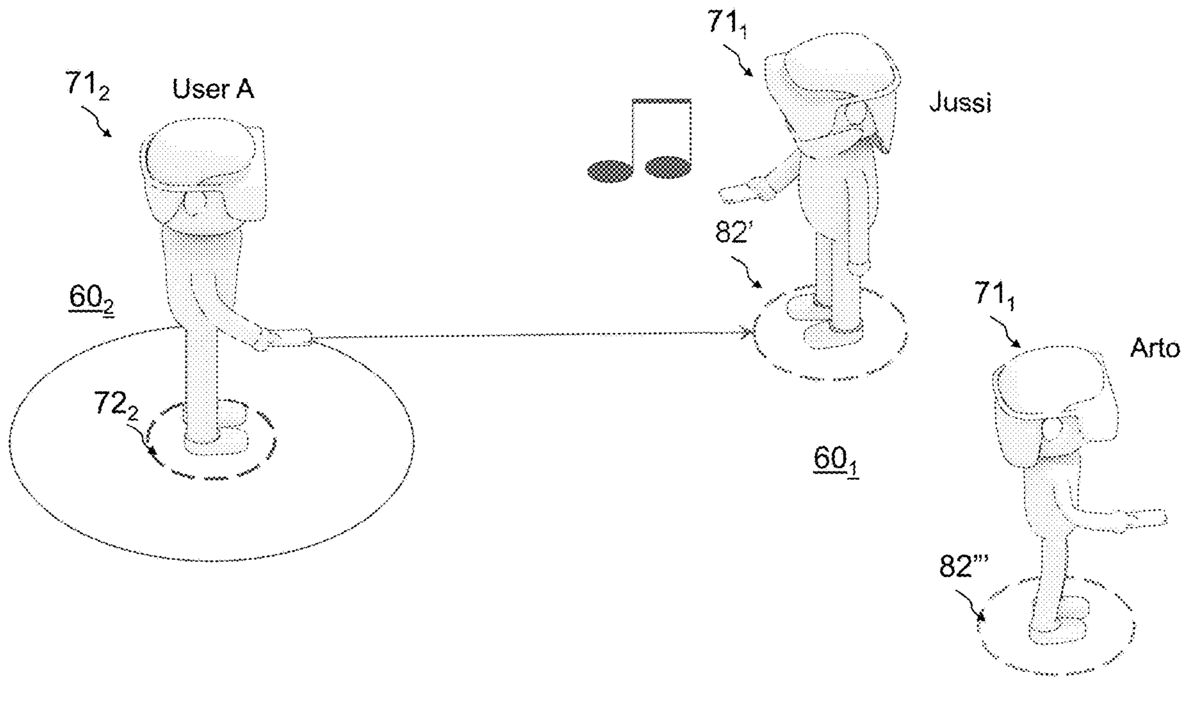

Following on from FIG. 10, in the example of FIG. 11, the joining participant $\mathbf{71}_2$ (User A) previews Jussi's $\mathbf{71}_1$ teleport region 82'. The previewing triggers a first audio indication to Jussi $\mathbf{71}_1$ that can be characterized as teleport ring tone for immersive media. This way Jussi $\mathbf{71}_1$ is made aware that a user is considering joining him. This may allow in various embodiments for Jussi $\mathbf{71}_1$ to communicate back or just be prepared that another user (User A) $\mathbf{71}_2$ may soon appear in his virtual space $\mathbf{60}_1$.

In 3 DoF, the appearance of User A $\mathbf{71}_2$ can be limited to a new audio communication channel being opened between Jussi $\mathbf{71}_1$ and User A $\mathbf{71}_2$ and/or a change in the viewport visualization for example indicating that User A $\mathbf{71}_2$ has the same point of view $\mathbf{77}_1$ as Jussi $\mathbf{71}_1$. In 6 DoF, the appearance of User A $\mathbf{71}_2$ could occur within the rendered content that is within the virtual visual scene (and corresponding sound scene). The joining participant, User A, $\mathbf{71}_2$ could for example become visible in front of the existing participant $\mathbf{71}_1$ and could move virtual objects that are mutually visible to Jussi $\mathbf{71}_1$ and User A $\mathbf{71}_2$.

The teleport ring tone for immersive media may be, for example one of:

- modification of an audio object in the virtual space $\mathbf{60}_1$ within the existing participant's $\mathbf{71}_1$ (Jussi's) virtual visual scene;
- rendering to the existing participant $\mathbf{71}_1$ (Jussi) an audio object from the sound scene of the joining participant $\mathbf{71}_2$ (User A);
- a system-generated audio object;
- an audio object that the joining participant $\mathbf{71}_2$ (User A) has created for this purpose, for example, their personalized greeting message;
- an audio object that the existing participant $\mathbf{71}_1$ (e.g. Jussi) has created, for example, for each of his friends. Jussi might have a specific track that starts playing for one or a group of contacts.

In some cases, the teleport ring tone for immersive media can be accompanied by a visual indication or visual content. For example, such visual content could become visible only when the existing participant $\mathbf{71}_1$ (Jussi) reacts to the ring tone that appears in his area, for example, by performing an activation gesture.

After previewing the virtual space $\mathbf{60}_1$, the joining participant $\mathbf{71}_2$ (User A) can indicate an intent to teleport and join the virtual space $\mathbf{60}_2$ to share the extended reality with the existing participant $\mathbf{71}_1$ (Jussi).

If the existing participant $\mathbf{71}_1$ (Jussi) is experiencing extended reality by himself at the virtual space $\mathbf{60}_2$ then the existing participant's $\mathbf{71}_1$ (Jussi) join configuration $\mathbf{32}_1$ enables joining to the existing participant $\mathbf{71}_1$ (Jussi) without affirmation by the existing participant $\mathbf{71}_1$ (Jussi).

If, however, the existing participant $\mathbf{71}_1$ (Jussi) is experiencing extended reality with existing participant $\mathbf{71}_1$ (Arto) who has a more restrictive join configuration $\mathbf{32}_1$ then Jussi's $\mathbf{71}_1$ join configuration is inherited from Arto $\mathbf{71}_1$ and only enables joining to Jussi $\mathbf{71}_1$ with affirmation.

Figure 12:
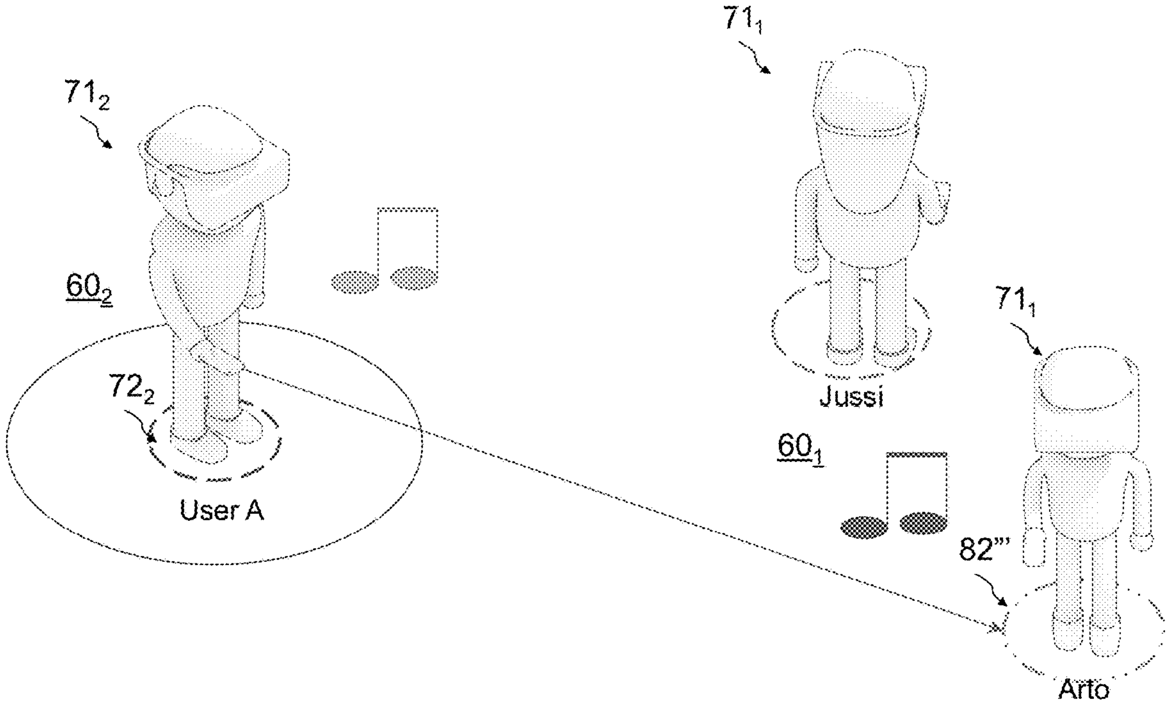

Following on from FIG. 10, in the example of FIG. 12, the joining participant $\mathbf{71}_2$ (User A) previews an existing participant's $\mathbf{71}_1$ (Arto's) teleport region 82'''. The join configuration $\mathbf{32}_1$ associated with Arto $\mathbf{71}_1$ means that Arto $\mathbf{71}_1$ accepts requests for joining from other users, but does not allow direct joining.

The previewing triggers a first audio indication to Arto $\mathbf{71}_1$ that can be characterized as teleport ring tone for immersive media. This way Arto $\mathbf{71}_1$ is made aware that a second user is considering joining him. Arto $\mathbf{71}_1$ is required to respond in order for the teleport to occur. The joining participant $\mathbf{71}_2$ (User A) now requires a "permission" from the existing participant $\mathbf{71}_1$ (Arto) to join with existing participant $\mathbf{71}_1$ (Arto). However, the permission from existing participant $\mathbf{71}_1$ (Arto) may not directly trigger the teleportation, since the joining participant $\mathbf{71}_2$ (User A) was only previewing the content. Thus, if Arto $\mathbf{71}_1$ accepts the request, in this example, Arto $\mathbf{71}_1$ will continue to hear an audio indication from User A's $\mathbf{71}_2$ preview action. This may be a different audio indication than the one Arto $\mathbf{71}_1$ heard before his response.

As the joining participant $\mathbf{71}_2$ (User A) is previewing content where they require a permission to join, a second audio indication may be provided to the joining participant $\mathbf{71}_2$ (User A) himself. This can use a similar selection mechanism as the first audio indication. The waiting for the response and the response itself can be indicated to the joining participant $\mathbf{71}_2$ (User A) by a second and third immersive audio indicator.

It can furthermore be indicated that the existing participant $\mathbf{71}_1$ (Arto) has been made aware of the request and is considering whether to accept, using a further audio indication to the joining participant $71_2$ (User A). This audio may be similarly chosen, as the first teleport ring tone.

The joining participant $71_2$ (User A) joins the existing participant $71_1$ (Arto) in the extended reality in response to acceptance of a request to join made by the joining participant $71_2$ (User A). The join configuration $32_1$ of the existing participant $71_1$ (Arto) determines whether the acceptance of a request to join made by the joining participant $71_2$ (User A) is automatic or is dependent upon an affirmation by the existing participant $71_1$ (Arto).

Figure 13:
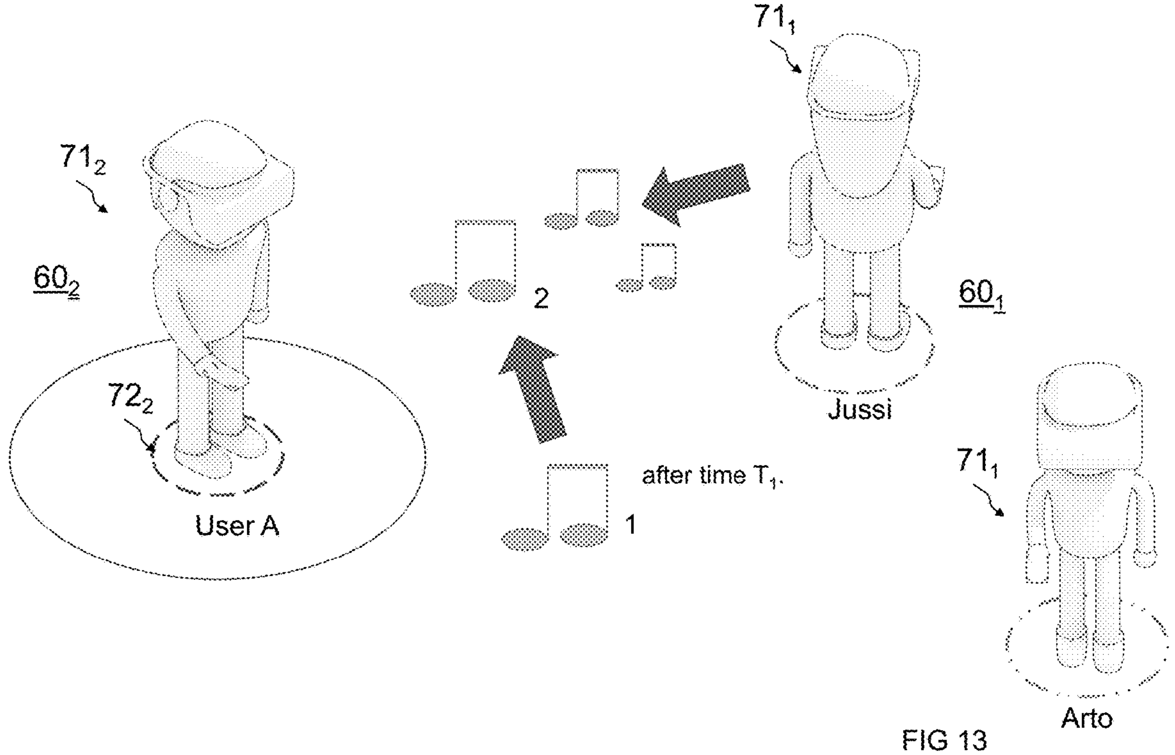

Referring to the example of FIG. 13, a joining participant $71_2$ (User A) has previewed an existing participant's $71_1$ (Arto's) region and the existing participant $71_1$ (Arto) has not responded to the request. Joining participant $71_2$ (User A) hears a second audio indication. The joining participant $71_2$ (User A) is not aware that Jussi $71_1$ would be available, and it is taking Arto $71_1$ a long time to provide a response.

The system begins, after a time threshold $T_1$, to provide the joining participant $71_2$ (User A) with alternative, less restricted teleport regions 82. In particular, an existing participant $71_1$ (Jussi) is presented as available with direct joining. The audio indication to joining participant $71_2$ (User A) begins to move in Jussi's $71_1$ direction and introduce audio elements from Jussi's $71_1$ part of the scene.

The joining participant $71_2$ (User A) can now gesture to preview Jussi's $71_1$ scene or directly join it based on the "pre-preview" provided by the audio modification (introduction of audio elements from Jussi's $71_1$ part of the scene).

Thus, the joining participant $71_2$ (User A) may initiate the multi-user extended reality by indicating their wish to teleport to a proximity of an existing participant $71_1$. The existing participant $71_1$ has the ability to accept or reject based on the existing participant's $71_1$ preferences.

Figure 14:
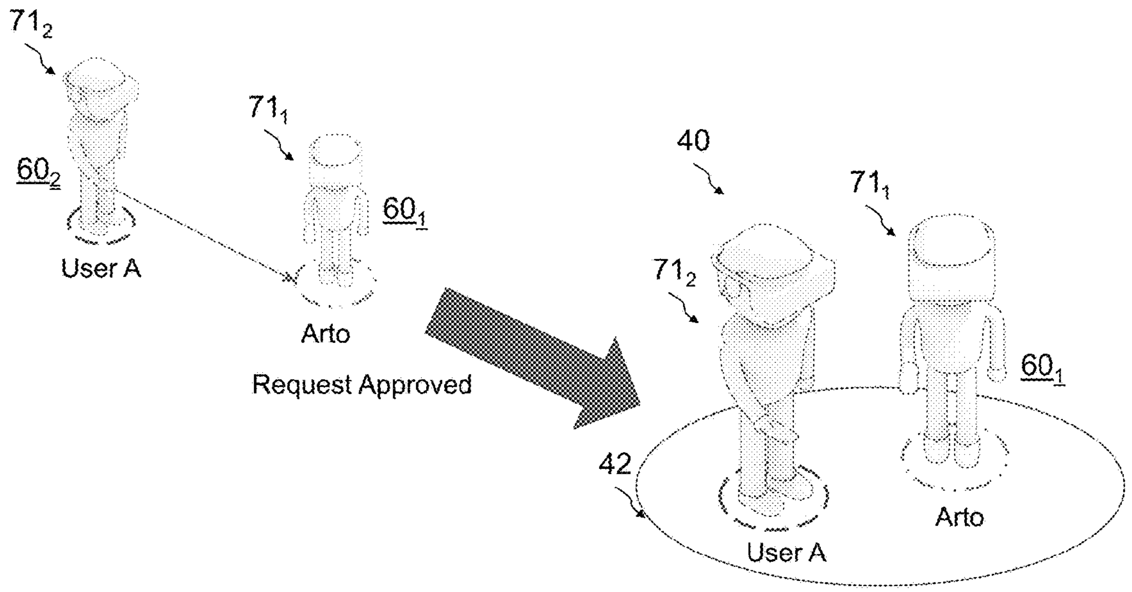

Referring to the example of FIG. 14, the joining participant $71_2$ (User A) has requested to join an existing participant's $71_1$ (Arto's) extended reality i.e., to teleport from virtual space $60_2$ to be co-located with the existing participant $71_1$ (Arto) in the virtual space $60_1$ and to share the extended reality.

In the FIG. 14, the existing participant $71_1$ (Arto) has accepted the request and the joining participant $71_2$ (User A) has confirmed the teleportation (or teleported automatically). The two participants $71_1$, $71_2$ now experience a shared extended reality at the virtual space $60_1$.

The FIG. 14 illustrates joining 40 an existing participant $71_1$ in extended reality at a location in a virtual space $60_1$, and a joining participant $71_2$ in extended reality to enable a shared extended reality. The joined participants $71_1$, $71_2$ in the shared extended reality are co-located 42 in the virtual space $60_1$ and share at least visually the virtual space $60_1$.

At least part of a content configuration $30_1$ is inherited 24 (not illustrated) from the existing participant $71_1$ by the joining participant $71_2$. The content configuration $30_1$ controls, for participant $71_2$ in the shared extended reality, what is heard, what is seen and interactivity with the virtual space $60_1$.

At least part of a join configuration 32 is inherited 24 between the existing participant $71_1$ and the joining participant $71_2$. The join configuration 32 controls joining of other joining participants in the shared extended reality at the virtual space $60_1$.

In this example, the inherited content configuration $30_1$ causes the participants $71_1$, $71_2$ to be able to see each other and to be able to communicate using audio with each other.

In some examples, the joining 40 can be accompanied with a start of a common audio-visual communication channel, which the existing participant $71_1$ can accept or reject.

Figure 15:
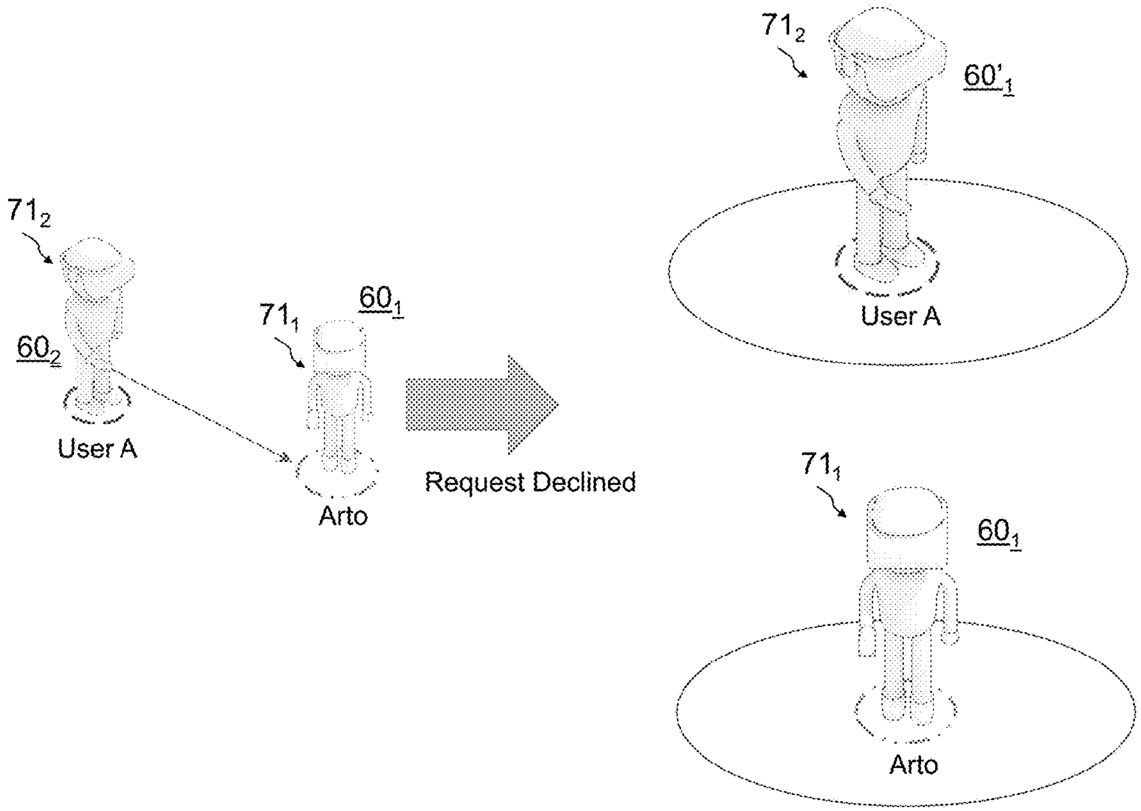

Referring to the example of FIG. 15, the joining participant $71_2$ (User A) wishes to join an existing participant $71_1$ (Arto) at virtual space $60_1$. The existing participant $71_1$ (Arto) declines the request.

After the existing participant $71_1$ (Arto) has declined the request, the joining participant $71_2$ (User A) still has the opportunity to teleport to the virtual space $60_1$.

The joining participant $71_2$ (User A) chooses teleport. The teleport is carried out according to a private mode of teleportation.

The joining participant $71_2$ (User A) is teleported to the virtual space $60_1$ but an instance of the virtual space $60_1$ that does not have the existing participant $71_1$.

The joining participant $71_2$ (User A) is not joined to a shared extend reality but teleports to the virtual space $60_1$ (only).

Both participants $71_1$, $71_2$ are now in distinct separate instances of the virtual space $60_1$. The participant $71_2$ is now in a new instance $60'_1$ of the virtual space $60_1$.

The two participants $71_1$, $71_2$ experience the extend reality content at different independent instances of the same virtual space $60_1$. The participants $71_1$, $71_2$ are not visible or audible to each other. In some implementations, there may be interactive elements in the virtual space that are common to the instances of that virtual space.

The system can allow for an existing participant $71_1$ to choose whether they wish to experience the extended reality content together as shared extended reality content (e.g., Social VR) or to remain private.

Figure 16A:
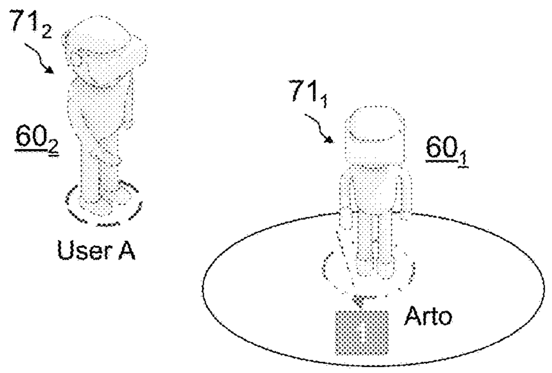
Figure 16B:
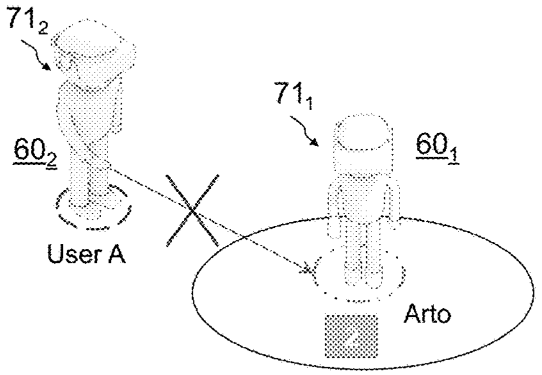

Referring to the examples of FIGS. 16A & 16B, a joining participant $71_2$ (User A) wishes to teleport to share an extended reality with existing participant $71_1$ (Arto) at the virtual space $60_1$.

In FIG. 16A, the joining participant $71_2$ (User A) is previewing the existing participant's $71_1$ (Arto) virtual space $60_1$. A request to join existing participant $71_1$ (Arto) is, at least temporarily, rejected based on the content properties of the extended reality content associated with virtual space $60_1$.

In this example, the existing participant $71_1$ (Arto) has previously interacted with extended reality content in such a way that the shared extended reality experience between joining participant $71_2$ (User A) and existing participant $71_1$ (Arto) would be substantially compromised if the joining participant $71_2$ (User A) were allowed to join existing participant $71_1$ (Arto) in a shared extended reality experience at the virtual space $60_1$.

The existing participant $71_1$ (Arto) has, in this example, just interacted with a virtual object defined by the extended reality content and caused an outcome.

In some cases, this interaction could be saved as a state of the virtual space $60_1$. The virtual space $60_1$ therefore has a pre-interaction state and a post-interaction state. If the joining participant $71_2$ (User A) were to teleport into the virtual space $60_1$, after the interaction, the joining participant $71_2$ (User A) would enter the virtual space $60_1$ in the post-interaction state. This may be undesirable. The system can prevent teleporting in this situation and others based on the state of the virtual space $60_1$, which is in turn dependent upon content.

Another example of not allowing teleporting based on content would be if there is something later on in the content which requires that the two users have not seen something together (because, for example, they see it differently). For example, let us consider a cinematic immersive media content, where one participant's user-selected narrative is one where the hero gets the job in the interview and another participant's user-selected narrative is one where the hero does not get the job). In this case, the two participants $71_1$, $71_2$ cannot be seeing the same interview in proximity of each other.

A further example of cinematic content is where teleporting would be temporarily disabled if there is a substantial cut scene or animation ongoing. During this it could appear unnatural and disturbing for a user to receive an incoming teleporting participant $71_2$ in their extended reality experience.

According to this embodiment, there can be, for example, a temporary decline of teleportation request based on the content consumption state of the existing participant and/or the requesting participant $71_2$. After a subsequent trigger within the content, the two users can, for example, be automatically joined in the same shared extend reality (according to a request to do so).

Thus, the joining of the joining participant $71_2$ can be dependent upon a content of the extended reality experienced by the existing participant $71_1$. For example, a join can be auto-rejected based on content.

Figure 17A:
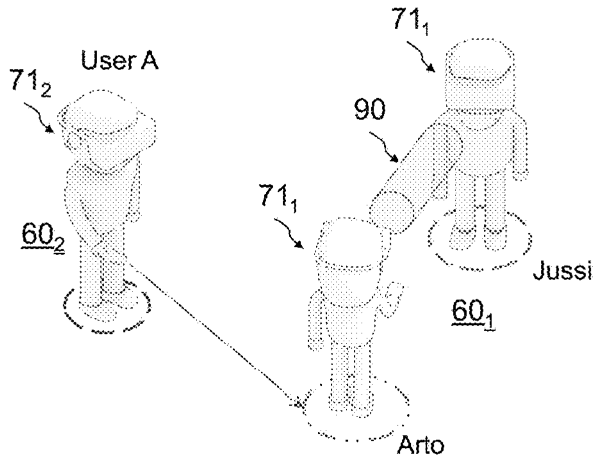
Figure 17B:
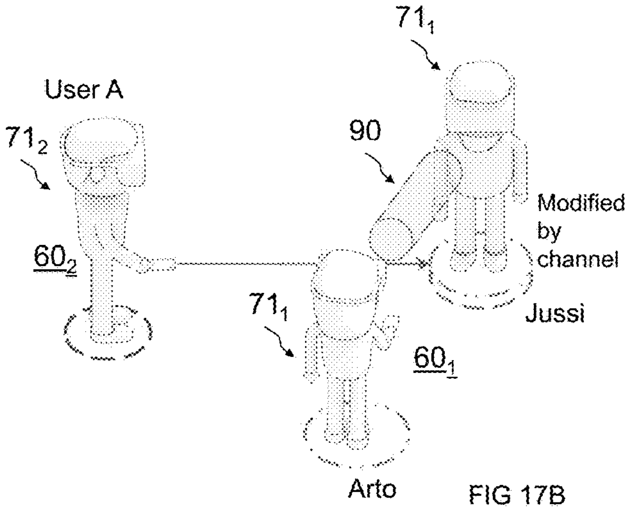

Referring to the example of FIGS. 17A & 17B, in various embodiments of multi-user extend reality, participants 71 can have means to communicate with each other privately, in parallel, to the shared extended reality. For example, this can be considered in MPEG-I 6 DoF Social VR use cases. Thus, for example, a voice communications channel 90 can be made available for users regardless of being joined in the same audio-visual extended reality, when users are users of the same multi-user extended reality system.

In FIG. 17A, a requesting participant $71_2$ (user A) wishes to teleport to a shared extended reality with existing participants $71_1$ (Arto or Jussi), who are located at different parts of the virtual space $60_1$ but who share a voice communications channel 90 that the requesting participant $71_2$ (user A) is not part of.

An existing participant's $71_1$ (e.g. Arto's) join configuration allows the existing participant's $71_1$ to accept or reject the join request, and if accepting to join or not join the joining participant $71_2$ to the voice communications channel 90.

The other existing participant's $71_1$ (e.g. Jussi's) join configuration 32 is, in the absences of a shared extended reality between Arto and Jussi, less restrictive than Arto's and automatically accepts a join request while joining participant $71_2$ to the voice communications channel 90.

The presence of the voice communications channel 90, however, causes Jussi's join configuration 32 to inherit the more restrictive aspects of Arto's join configuration 32.

If the requesting participant $71_2$ (user A) wishes to join an existing participant $71_1$ (e.g. Arto) in shared extended reality, the existing participant's $71_1$ (e.g. Arto's) permission is sufficient. This is because the voice communications channel 90 can be kept private by Arto's response. The voice communications channel 90 can be kept private because the existing participant's $71_1$ (e.g. Arto's) join configuration 32 allows the existing participant $71_1$ (e.g. Arto) to accept or reject the join request, and if accepting whether or not to join or not join the joining participant $71_2$ to the voice communications channel 90.

In FIG. 17B, the requesting participant $71_2$ (user A) wishes to join an existing participant $71_1$ (e.g. Jussi). The existing participant's $71_1$ (e.g. Jussi's) permission level in the associated join configuration 32 is modified based on the existence of the voice communications channel 90, and at least Arto's $71_1$ permission is required. The system can also require the requesting participant $71_2$ (user A) to receive permission from Jussi $71_1$.

The voice communications channel 90 may have privacy settings or at least a minimum level of privacy is implied by inheritance between join configurations 32 of the existing participants $71_1$ in the voice communications channel 90.

Figure 18A:
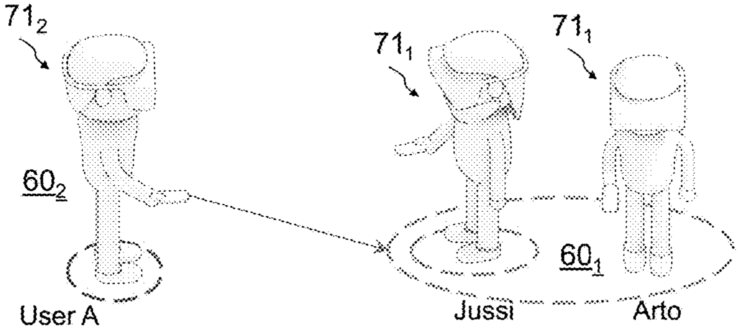
Figure 18B:
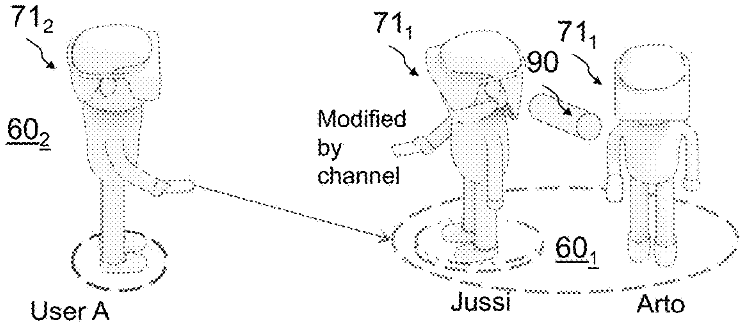

Referring to the example of FIG. 18A, 18B, the joining participant $71_2$ (User A) wishes to teleport to a joint experience with existing participants $71_1$ (Arto and Jussi), who share extended reality at the virtual space $60_1$. Arto and Jussi are in common location, they can see and hear each other.

In FIG. 18A, the teleportation is straightforward if the existing participants $71_1$ (Arto and Jussi) do not have a private voice communications channel 90. In this case, the highest permission level is inherited between the join configurations 32 of the existing participants $71_1$ (Arto and Jussi) and is applied to control the join. Thus the joining participant $71_2$ (User A) will require the existing participant $71_1$ (Arto) to approve the teleportation. The highest permission level is inherited between the join configurations 32 of the participants $71_1$, $71_2$. That is permission is required from Arto $71_1$, irrespective of whether the join request is made to Arto $71_1$ or to Jussi $71_1$.

After the join the three participants $71_1$, $71_2$ (Arto and Jussi, User A) share extended reality at the virtual space $60_1$. The highest permission level is inherited between the join configurations 32 of the participants $71_1$, $71_2$ (Arto and Jussi, User A). For example, permission may be required from Arto $71_1$, irrespective of whether a new join request, for new joining participant, is made to User A $71_2$, Arto $71_1$ or to Jussi $71_1$.

In FIG. 18A, Arto $71_1$ and Jussi $71_1$ have a private voice communication channel 90 activated, the voice communication channel 90 temporarily modifies the highest permission level of the join configuration shared by the existing participants $71_1$ (Arto and Jussi). The permission of all the participants in the voice communications channel 90 are required. That is permission is required from both Arto $71_1$ and Jussi $71_1$, irrespective of whether the join request is made to Arto $71_1$ or to Jussi $71_1$, to enable teleportation.

Thus, the join configuration 32 for an existing participant $71_1$ adapts, when the existing participant $71_1$ has an open voice communication channel 90, to require explicit authorization for a join from the existing participant $71_1$ and the other user or users who are communicating in the voice communication channel 90.

Figure 19A:
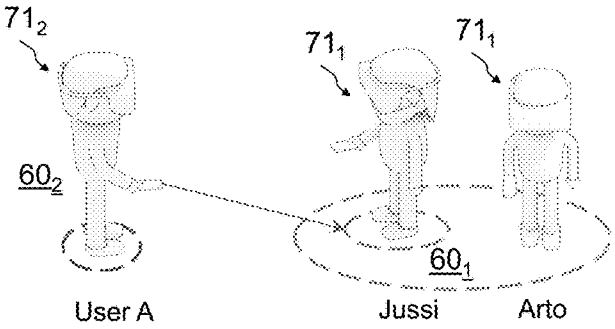

In the example of FIG. 19A the joining participant $71_2$ (User A) can preview the virtual space $60_1$ used for a shared extended reality by existing participants $71_1$ (Arto and Jussi) in the shared extended reality.

The permissions of the join configurations 32 is as before. Jussi's $71_1$ join configuration (without inheritance) allows joining without affirmation from Jussi $71_1$. Arto's $71_1$ join configuration allows joining but only with affirmation from Arto $71_1$. Jussi's $71_1$ join configuration (after inheritance from Arto $71_1$ on sharing the extended reality at the virtual space $60_1$) allows joining but only with affirmation from Arto $71_1$.

Therefore, a request from User A $71_2$ to join the shared extended reality made to Arto $71_1$ requires permission from Arto $71_1$ and a request to join the shared extended reality made to Jussi $71_1$ requires permission from Arto $71_1$ (because of inheritance of more restrictive permission requirement to Jussi's $71_1$ join configuration).

Figure 19C:
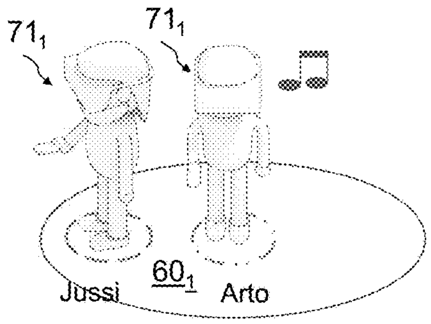
Figure 19B:
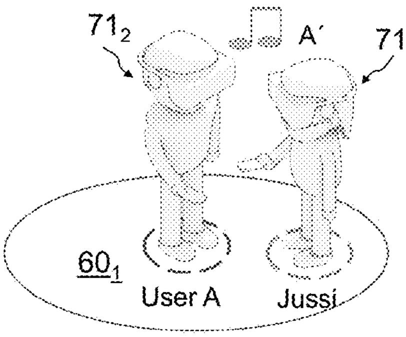
Figure 19D:
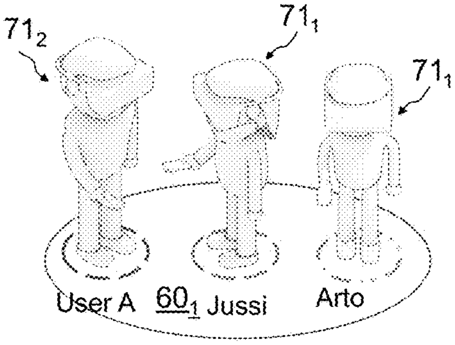

In the example of FIG. 19D, a request from User A $\mathbf{71}_2$ to join the extended reality shared by Arto $\mathbf{71}_1$ and Jussi $\mathbf{71}_1$ is made to either Arto $\mathbf{71}_1$ or Jussi $\mathbf{71}_1$. An audio indication is made to Arto $\mathbf{71}_1$ as permission is required from Arto $\mathbf{71}_1$. Permission is received from Arto $\mathbf{71}_1$ and there is a successful join, for example, as described with reference to FIG. 18A. User A $\mathbf{71}_2$, Arto $\mathbf{71}_1$ and Jussi $\mathbf{71}_1$ shared an extended reality.

If permission for the join is withheld by Arto $\mathbf{71}_1$ then in some examples no teleportation occurs, as illustrated in the example of FIG. 19C.

However, in some examples, if the request to join is made to Jussi $\mathbf{71}_1$ then if Arto $\mathbf{71}_1$ withholds permission for User A $\mathbf{71}_2$ to join a shared extended reality comprising User A $\mathbf{71}_2$, Arto $\mathbf{71}_1$ and Jussi $\mathbf{71}_1$, a new instance of a shared extended reality can be created comprising User A $\mathbf{71}_2$ and Jussi $\mathbf{71}_1$ but not Arto $\mathbf{71}_1$. This is illustrated in the example of FIG. 19B.

There may be a first audio indication to Jussi $\mathbf{71}_1$ denoting the preview by User A $\mathbf{71}_1$ before they are joined.

Jussi $\mathbf{71}_1$ sees in his environment both the user and Arto $\mathbf{71}_1$, while User A $\mathbf{71}_2$ and Arto $\mathbf{71}_1$ only see Jussi $\mathbf{71}_1$.

After the teleportation to the instance of the shared extended reality that includes Jussi $\mathbf{71}_1$ but not Arto $\mathbf{71}_1$, Arto $\mathbf{71}_1$ may be played a modified audio indication letting him know that User A $\mathbf{71}_2$ is at the same location (just in a parallel instance), and similarly a modified audio indication may be provided to User A $\mathbf{71}_2$.

Thus, different instances of the same virtual space $\mathbf{60}_1$ are created for User A $\mathbf{71}_2$ and Arto $\mathbf{71}_1$, for example, as described previously with reference to FIG. 15

Figures 20A, 20B, 20C, 20D:
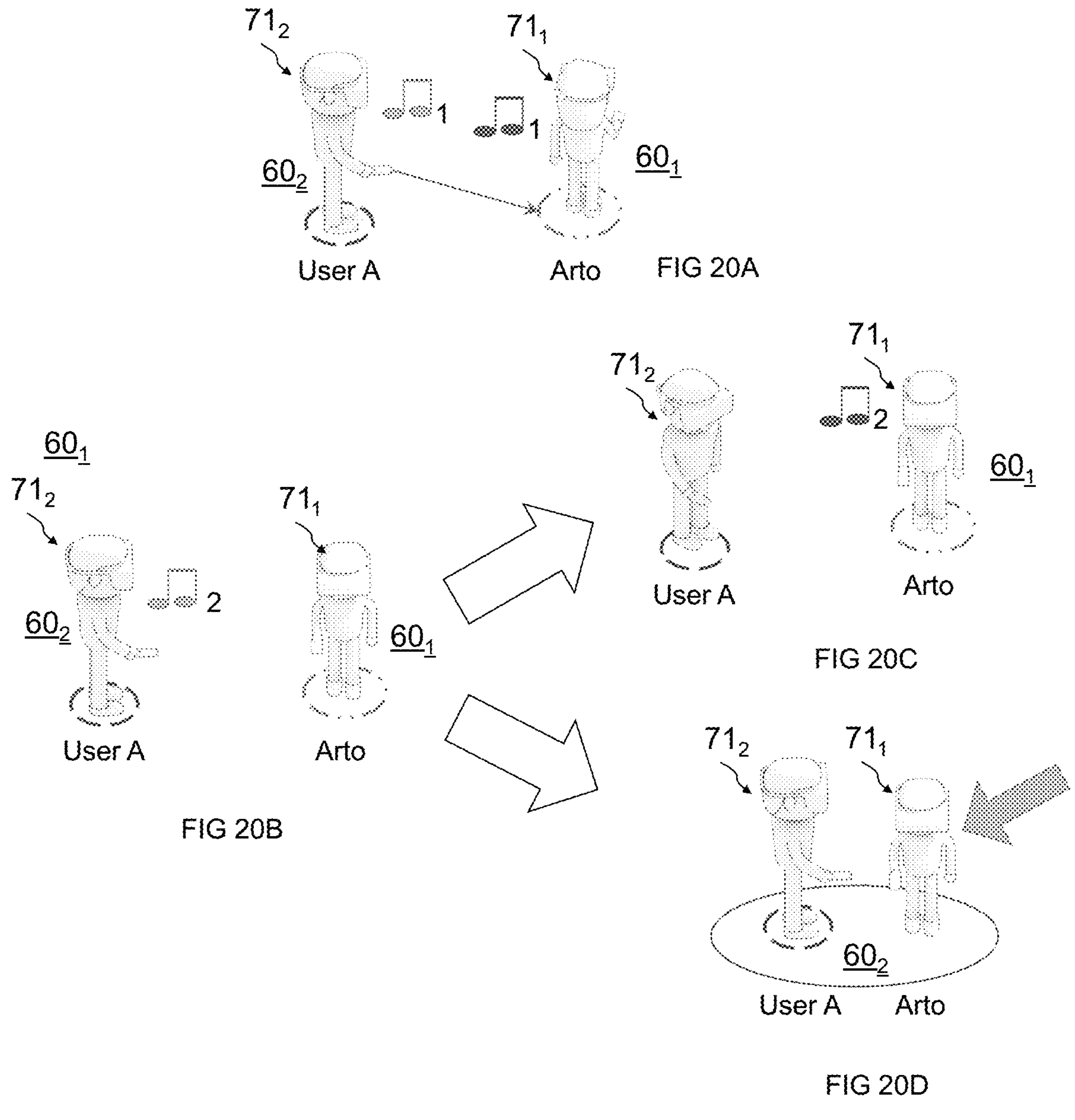

Referring to the example of FIG. 20A the joining participant $\mathbf{71}_2$ (User A), who is at the virtual space $\mathbf{60}_2$, wishes to teleport to share extended reality with existing participant $\mathbf{71}_1$ (Arto) at the virtual space $\mathbf{60}_1$.

In this example, the requested existing participant $\mathbf{71}_1$ (e.g., Arto) does not wish to have another participant $\mathbf{71}_2$ (e.g. User A) join him at his current location (virtual space $\mathbf{60}_1$). However, the requested existing participant $\mathbf{71}_1$ (Arto) wants to teleport to share extended reality with the requesting joining participant $\mathbf{71}_2$ (User A) at the virtual space $\mathbf{60}_2$. Therefore Arto $\mathbf{71}_1$ responds with a “call back” action. User A $\mathbf{71}_2$ is indicated that Arto $\mathbf{71}_1$ will join User A $\mathbf{71}_2$ instead, when he is ready.

As illustrated in the example of FIG. 20B, User A $\mathbf{71}_2$ can receive a periodic audio indication that Arto $\mathbf{71}_1$ is still expected to join. Either User A $\mathbf{71}_2$ or Arto $\mathbf{71}_1$ is able to terminate the call back at any time e.g., user A $\mathbf{71}_1$ could change their permission level.

In the example of FIG. 20C, User A $\mathbf{71}_2$ has rejected the call back request, which is indicated to Arto. $\mathbf{71}_1$ If User A $\mathbf{71}_2$ does not reject the call back request, when Arto $\mathbf{71}_1$ is available, Arto $\mathbf{71}_1$ will teleport to join User A $\mathbf{71}_2$ at virtual space $\mathbf{60}_1$ as illustrated in the example of FIG. 20D.

From the foregoing, it can be appreciated that in at least some examples, the joining participant $\mathbf{71}_2$ joins the existing participant $\mathbf{71}_1$ in the extended reality in response to acceptance of a request to join made by the joining participant $\mathbf{71}_2$. The join configuration $\mathbf{32}_1$ of the existing participant $\mathbf{71}_1$ determines whether the acceptance of a request to join made by the joining participant $\mathbf{71}_2$ is automatic or is dependent upon an affirmation by the existing participant $\mathbf{71}_1$.

When a request by the joining participant $\mathbf{71}_2$ to join an existing participant $\mathbf{71}_1$ in extended reality at a location of the existing participant $\mathbf{71}_1$ is not accepted, a contention resolution process can determine a location in the virtual space 60 at which the requesting participant $\mathbf{71}_2$ experiences extended reality and whether or not the requesting participant $\mathbf{71}_2$ experiences a shared extended reality with another participant 71.

For example, depending upon the contention resolution, the requesting joining participant $\mathbf{71}_2$ can be:

i) located at a location of the requested existing participant, without that existing participant [FIG. 15]

ii) co-located at a location of the requested existing participant, with a different existing participant(s) [FIG. 13]

iii) co-located at a location of the requesting participant, with the requested existing participant [FIG. 20D]

iv) co-located with the requested existing participant but not all the existing participants at a virtual space [FIG. 19B]

In examples i) and iv), there are split worlds, that is different instances of extended reality. It is possible for one participant to have extended reality in respect of a particular part of a virtual space and for another participant to have extended reality in respect of that same particular part of a virtual space but for the two participants to be unaware of each other. One participant occupies one instance of that virtual space and the other participant occupies another independent instance of that virtual space. The two instances are separated wholly or partially.

In example i) and ii) the teleport is prioritized to location. The process enables a location-only teleport for the requesting joining participant $\mathbf{71}_2$ which does not join the existing participant $\mathbf{71}_1$ in extended reality at the location in the virtual space $\mathbf{60}_1$, and the requesting joining participant $\mathbf{71}_2$ in extended reality to enable a shared extended reality at the virtual space $\mathbf{60}_1$, but instead enables the requesting joining participant $\mathbf{71}_2$ to experience extended reality at a location in the virtual space $\mathbf{60}_1$, that is not shared with the existing participant $\mathbf{71}_1$.

In example iii) the teleport prioritizes the requested existing participant over location.

In example iv) the teleport prioritizes the requested existing participant over other nearby participants.

The join request can imply priorities to help with contention e.g. whether joining the location is key, joining a user is key, or joining multiple users is key. If location is key, outcomes i) and ii) are more likely. If joining a particular user is key, outcomes ii) and iv) are more likely.

When a joining participant $\mathbf{71}_2$ requests to join an existing participant $\mathbf{71}_1$ in an extended reality at a location of the existing participant a response to the request can be inter alia:

join with the requested existing participant at requested location [FIG. 14];

join with requested existing participant but not at requested location [FIG. 20];

join without requested existing participant at requested location [FIG. 15, FIG. 20];

at least partial rejection of request dependent upon existing user [FIG. 15];

at least partial rejection of request dependent upon content rendered for shared extended reality [FIG. 16A, 16B];

timeout [FIG. 13];

alternative join option [FIG. 13, 20].

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor; and at least one memory including computer program code, the at least one memory and the computer program code configured to, with the at least one processor, cause the apparatus to at least:

join to at least an existing participant in an extended reality at a location in a virtual space, a joining participant in the extended reality to enable a shared extended reality, wherein the existing participant and the joining participant in the shared extended reality are initially at least co-located in the virtual space and can share at least visually the virtual space;

wherein at least part of a content configuration is inherited from the existing participant by the joining participant, wherein the content configuration controls, for the existing participant and the joining participant, an audio element of the virtual space, a visual element of the virtual space, and interactivity with the virtual space;

wherein at least part of a join configuration is inherited between the existing participant and the joining participant, wherein the join configuration controls joining of one or more joining participants in the shared extended reality, wherein the join configuration for the existing participant adapts responsive to the existing participant having an open voice communication channel to require explicit authorization to join the shared extended reality from the existing participant and one or more other users that are communicating in the voice communication channel.

2. The apparatus as claimed in claim 1, wherein the inheritance of the content configuration is hierarchical and has a direction from the existing participant to the joining participant who is joining the extended reality and wherein the inheritance of the join configuration is hierarchical and is dependent upon one or more parameters of the join configuration for the existing participant and one or more parameters of the join configuration for the joining participant.

3. The apparatus as claimed in claim 1, wherein, for the inheritance of the content configuration, the existing participant is dominant so that the joining participant has, at least initially, substantially the same content experience as the existing participant, wherein the joining participant inherits at least one or more parameters that control what is heard within the extended reality, what is seen within the extended reality, what interactivity is possible with objects within the virtual space.

4. The apparatus as claimed in claim 1, wherein, for the inheritance of the join configuration, at least one of the joining participant or the existing participant inherits at least one or more parameters that control one or more of:

at least one of whether or from whom to have explicit consent to join the extended reality;

at least one of whether or to whom to give notification of a request to join the extended reality; or at least one of whether or to whom to give notification of a joining participant joining the extended reality.

5. The apparatus as claimed in claim 1, wherein, for the inheritance of the join configuration, there is inherited equality so that, at least initially, the existing participant and the joining participant share the same control of j oining, wherein at least one of the joining participant or the existing participant inherits at least one or more parameters that control joining that is more restrictive than its current parameter.

6. The apparatus as claimed in claim 1, wherein the joining of the joining participant is dependent upon a content of the extended reality experienced by the existing participant.

7. The apparatus as claimed in claim 1, wherein the joining participant joins the existing participant in the extended reality in response to acceptance of a request to join made by the joining participant, wherein the join configuration of the existing participant determines whether the acceptance of the request to join made by the joining participant is automatic or is dependent upon an affirmation by the existing participant.

8. The apparatus as claimed in claim 1, wherein when the joining participant makes a request to join the existing participant in the extended reality at the location of the existing participant that is not accepted, then a contention resolution process determines a location in the virtual space at which the joining participant experiences the extended reality and whether or not the joining participant experiences the shared extended reality with another participant.

9. The apparatus as claimed in claim 1, wherein when the joining participant requests to join the existing participant in the extended reality at the location of the existing participant a response to the request can be: allow the joining participant to join the existing participant; reject the request for a reason dependent upon the existing participant; reject the request for a reason dependent upon content rendered for the shared extended reality; a request to join at a different location; a timeout; or an alternative join option.

10. The apparatus as claimed in claim 1, wherein, after the joining, the existing participant participates in the extended reality and can control a point of view within the virtual space;

a newly joined participant participates in the extended reality and can control a point of view within virtual space, wherein the point of view associated with the existing participant and the point of view associated with the joining participant are independently controllable by the respective existing participant and the respective joining participant.

11. The apparatus as claimed in claim 1, further configured to cause to provide to the joining participant a preview of the shared extended reality before the joining participant requests to join the shared extended reality, wherein the preview comprises existing participant at the location.

12. The apparatus as claimed in claim 1, wherein the content configuration controls at least visual and/or audio interaction between at least the joining participant and the existing participant of the shared extended reality.

13. The apparatus as claimed in claim 1, wherein the content configuration is configured to control whether the joining participant in the virtual space is visible to the existing participant and one or more other participants in the virtual space, whether the joining participant in the virtual space is audible to the existing participant and the one or more other participants in the virtual space, whether the existing participant and the one or more other participants in the virtual space are visible to the joining participant in the virtual space, and whether the existing participant and the one or more other participants in the virtual space are audible to the joining participant in the virtual space.

14. The apparatus as claimed in claim 1, wherein after the joining participant and the existing participant are joined to share the virtual space, an orientation of a point of view of the joining participant in the virtual space is selected so that the existing participant is immediately visible to the joining participant.

15. A method comprising:

initiating joining to at least an existing participant in an extended reality at a location in a virtual space, a joining participant in the extended reality to enable a shared extended reality;

causing a content configuration to be inherited from the existing participant by the joining participant, wherein the content configuration controls, for the existing participant and the joining participant, an audio element of the virtual space, a visual element of the virtual space, and interactivity with the virtual space;

causing at least part of a join configuration to be inherited between the existing participant and the joining participant, wherein the join configuration controls joining of one or more joining participants in the shared extended reality, and wherein the join configuration for the existing participant adapts responsive to the existing participant having an open voice communication channel to require explicit authorization to join the shared extended reality from the existing participant and one or more other users that are communicating in the voice communication channel; and completing joining to at least the existing participant in the extended reality the joining participant in the extended reality to enable the shared extended reality, wherein the existing participant and the joining participant are initially, at least co-located in the virtual space and can share at least visually the virtual space.

16. The method as claimed in claim 15, wherein the inheritance of the content configuration is hierarchical and has a direction from the existing participant to the joining participant who is joining the extended reality and wherein the inheritance of the join configuration is hierarchical and is dependent upon one or more parameters of the join configuration for the existing participant and one or more parameters of the join configuration for the joining participant.

17. The method as claimed in claim 15, wherein, for the inheritance of the content configuration, the existing participant is dominant so that the joining participant has, at least initially, substantially the same content experience as the existing participant, wherein the joining participant inherits at least one or more parameters that control what is heard within the extended reality, what is seen within the extended reality, what interactivity is possible with objects within the virtual space.

18. The method as claimed in claim 15, wherein, for the inheritance of the join configuration, at least one of the joining participant or the existing participant inherits at least one or more parameters that control one or more of:

at least one of whether or from whom to have explicit consent to join the extended reality;

at least one of whether or to whom to give notification of a request to join the extended reality; or at least one of whether or to whom to give notification of a joining participant joining the extended reality.

19. The method as claimed in claim 15, wherein, for the inheritance of the join configuration, there is inherited equality so that, at least initially, the existing participant and the joining participant share the same control of joining, wherein at least one of the joining participant or the existing participant inherits at least one or more parameters that control joining that is more restrictive than its current parameter.

20. A non-transitory computer readable medium comprising program instructions stored thereon for performing at least the following:

joining to at least an existing participant in an extended reality at a location in a virtual space, a joining participant in the extended reality to enable a shared extended reality, wherein the joining participant and the existing participant in the shared extended reality are initially at least co-located in the virtual space and can share at least visually the virtual space;

wherein at least part of a content configuration is inherited from the existing participant by the joining participant, wherein the content configuration controls, for the existing participant and the joining participant, an audio element of the virtual space, a visual element of the virtual space, and interactivity with the virtual space;

wherein at least part of a join configuration is inherited between the existing participant and the joining participant, wherein the join configuration controls joining of one or more joining participants in the shared extended reality, wherein the join configuration for the existing participant adapts responsive to the existing participant having an open voice communication channel to require explicit authorization to join the shared extended reality from the existing participant and one or more other users that are communicating in the voice communication channel.

* * * * *